United States Patent
Reudink et al.

(10) Patent No.: US 7,039,441 B1
(45) Date of Patent: May 2, 2006

(54) HIGH SPEED FIXED WIRELESS VOICE/DATA SYSTEMS AND METHODS

(75) Inventors: Douglas O. Reudink, Kirkland, WA (US); Mark D. Reudink, Seattle, WA (US)

(73) Assignee: Kathrein-Werke KG, Rosenheim (DE)

( * ) Notice: Subject to any disclaimer, the term of this patent is extended or adjusted under 35 U.S.C. 154(b) by 0 days.

(21) Appl. No.: 09/422,210

(22) Filed: Oct. 19, 1999

(51) Int. Cl.
*H04B 1/38* (2006.01)

(52) U.S. Cl. .................. 455/562.1; 455/561; 455/277.1

(58) Field of Classification Search ............. 455/562.1, 455/561, 277.1, 277.2, 63.1, 63.2, 63.3, 63.4; 342/368, 371, 372, 373, 374; 370/328
See application file for complete search history.

(56) References Cited

U.S. PATENT DOCUMENTS

| | | | | |
|---|---|---|---|---|
| 5,610,617 A | * | 3/1997 | Gans et al. | |
| 5,907,816 A | * | 5/1999 | Newman et al. | |
| 6,009,124 A | * | 12/1999 | Smith et al. | |
| 6,118,767 A | * | 9/2000 | Shen et al. | |
| 6,233,466 B1 | * | 5/2001 | Wong et al. | |
| 6,236,866 B1 | * | 5/2001 | Meyer et al. | |
| 6,347,234 B1 | * | 2/2002 | Scherzer | |
| 6,473,616 B1 | * | 10/2002 | Sydor | |

* cited by examiner

*Primary Examiner*—David Hudspeth
*Assistant Examiner*—Huy Nguyen
(74) *Attorney, Agent, or Firm*—Fulbright & Jaworski LLP

(57) ABSTRACT

Systems and methods adapted to optimize data throughput in wireless communications network are shown and described. In the preferred embodiment multiple antenna beam base stations are utilized to provide reuse of communications channels. Reuse of the communications channels by the base stations is preferably optimized by considering mutually exclusive antenna beam pairs and antenna beam pairs providing reduced signal quality. A preferred embodiment control channel is taught which provides for the initial and subsequent identification and use of a most preferred antenna beam for establishing communications. Alternative embodiments of the invention utilize multiple antenna beam remote stations.

62 Claims, 9 Drawing Sheets

HIGH SPEED FIXED WIRELESS VOICE/DATA SYSTEMS AND METHODS

TECHNICAL FIELD

The invention relates to wireless communication systems and more particularly to systems and methods useful in establishing wireless communication systems capable of providing high data bandwidth channels at a plurality of base stations optimizing use of radio frequency spectrum.

BACKGROUND

It is often desirable to utilize wireless radio links to provide information communication. The use of wireless links may be advantageous where wired infrastructure (e.g., copper and/or fibre communication network) is not in place to provide information communication or where user demand, whether the number of users and/or the capacity required by users, does not make it economical to provide wired infrastructure. For example wireless local loop (WLL) is often thought of to provide voice services in places where wireline service is not available, such as in less developed countries and remote areas within the United States.

In addition to providing voice services to remote sites not otherwise provided wireline service, it may also be desired to use radio to provide high rate data services to fixed users where wireline service is inadequate or not available. However, a problem with providing high rate data services, such as 1 MB/s, is that RF spectrum is limited and expensive. For example, to attain high peak rates often required or desired by data systems, spectrum bandwidth on the order of 1 MHZ is typically required. Spectrum in the 1–3 GHz range may be utilized to attain high peak rates such as 1 MB/s. Such frequencies may also be suitable for use in providing data system communication as their frequency propagation conditions typically allow partial line-of-sight or even non-line-of-sight between a base station (BS) and a remote station (RS), thus simplifying deployment of a network.

Although possibly providing suitable spectrum for data system communications, spectrum in the 1–3 GHz range is becoming widely used for a range of wireless communications. This results in both the spectrum being expensive as well as potentially having a high level of noise energy, caused by multiple uses of the At millimeter wave (mm-wave) frequencies a great deal of spectrum is available. However, such frequencies have disadvantages associated with their use. For example, mm-wave propagation is typically limited to line-of-sight between a BS and a RS. Additionally, mm-wave radio propagation is severely limited by rain and terrain, requiring complex control systems to deal with temporary rain fades or increased transmit power to allow for a worst case scenario. Such increase power, in addition to the obvious expense in such a brute force solution, can limit reuse of frequencies because of the overlapping radiation patterns experienced when the conditions requiring the increased power are not present or are not fully present in a particular antenna beam. Nevertheless, multibeam antennas can provide benefit to this frequency band.

There are some lower frequencies where spectrum is still available. For example, there is unused personal communications services (PCS) spectrum and under utilized ultra-high frequency (UHF) television channel spectrum available in many geographic regions of the United States. Additionally spectrum associated with multichannel multipoint distribution service (MMDS), 200 MHZ bandwidth at 2.5 GHz, remains available in many areas. These portions of the spectrum often remain under/un-utilized because of the inability of service providers to efficiently and economically allocate the spectrum for use to multiple users.

In order to provide the desired data rate (data bandwidth) in the available spectrum to multiple users in an efficient and economical manner, it is advantageous to reuse frequencies. The reuse of frequencies in wireless systems has been done in cellular communication systems, where a plurality of BSs are allocated particular frequencies or ranges of frequencies to provide communications in an associated service area and where adjacent BSs or portions thereof are restricted from use of same frequencies. The use of narrow antenna beams in cellular systems can provide capacity gains of 100% or more, compared to ordinary sectorized cellular systems. However, the spectral reuse efficiency is still less than 25%, i.e., at most 25% of the spectrum is available for use at a single sight.

Code division multiple access (CDMA) cellular systems can reuse the spectrum 3 times at a cell sight. However, CDMA communications are quite inefficient in throughput. For example, one CDMA sector typically provides only 100 kbs (15 walsh codes×13 kbls) while using at least 1.5 MHZ bandwidth.

To make the best use of such frequencies, what is needed in the art is a robust, spectrally efficient system and method to provide voice and high rate data on demand to multiple geographically dispersed users.

SUMMARY OF THE INVENTION

These and other objects, features and technical advantages are achieved by a system and method which establishes a wireless system capable of providing high bandwidth data channels, i.e., several megabit data channels, at every BS in a network while using only a small amount of spectrum, i.e., a relative few radio frequency (RF) channels. It shall be appreciated that as used herein, channels may be comprised of frequency divisions, time divisions, and/or code divisions.

The preferred embodiment of the present invention utilizes a network of BSs deployed in a configuration to provide coverage to the RSs for which it is desired to provide wireless data communication services. For example, the network of BSs could include a deployment of BSs dense enough to assure coverage to a plurality of RSs throughout a particular geographic area, such as a metropolitan area.

The deployment of BSs to provide wireless data communication services in a defined geographic service area associated with each particular BS shall be referred to herein as having "cells" associated with each BS, wherein RSs disposed within the geographic boundaries of a cell communicate principally with the BS thereof. However, it should be appreciated that deployment of BSs of the present invention is not limited to the regular spacing intervals generally thought of when considering a typical cellular or PCS mobile wireless communication system. For example, it is anticipated that data communication will be provided to fixed point RSs in a preferred embodiment of the present invention. Accordingly, BSs may be deployed such that service areas sufficient to encompass a predetermined number of fixed point RSs without providing fully blanketed coverage throughout an area.

The BSs of the present invention preferably utilize multiple narrow beam antennas, multiple beam antennas (MBA), capable of directing energy into and out of any antenna beam on command. A preferred embodiment of the BSs of the present invention utilize multiple beam antennas providing 12 substantially non-overlapping antenna beams to provide directional wireless signal coverage in an area 360° around an associated BS. Additionally or alternatively, the multiple beam antennas of the BSs of the present invention may provide antenna beams which substantially overlap, such as to allow redundancy and/or to provide the ability for RSs to change to different channels, such as based on interference conditions.

The RSs of the present invention also preferably utilize multiple narrow beam antennas. Specifically, a most preferred embodiment of the RSs of the present invention utilize multiple beam antennas providing 12 substantially non-overlapping antenna beams to provide directional wireless signal coverage in an area 360° around an associated RS. The use of such directive antennas at the RSs of the preferred embodiment provides for a reduction in signal scattering and, thus, a reduction of unwanted energy in various antenna beams. However, the systems and methods of the present invention will work with some or all of the RSs having omnidirectional antennas. It should be appreciated that the result will be higher system capacity if directive antennas, whether multibeam or not, are used at the RSs.

Capacity is lowered in the network as radiation from a network BS reaches RSs outside the BSs service area and/or radiation from an RS reaches BSs outside the BS service area in which the RS is operating. This limitation is partially due to the limits on signal isolation of the BS and RS antenna patterns and partially due to signal scattering and propagation conditions. Accordingly, BSs of a preferred embodiment of the present invention include resources, such as interference cancellers in the receive links, to mitigate outside interference. Where BSs are provided such resources and the RSs are not, capacity is generally a downlink limitation.

Accordingly, a preferred embodiment of the present invention includes resources, such as interference cancellers, at the RSs. However, it should be appreciated that most data applications tend to be non-symmetric, with most of the traffic flowing from the BSs to the RSs, thus diminishing the effect of such downlink capacity limitations. Accordingly, a most preferred embodiment of the present invention forgoes the expense of inclusion of interference cancellers at the network RSs.

The preferred embodiment of the present invention employs systems and methods for determining which beams of a BS may be utilized with a particular channel simultaneously to provide increased data communication without intolerable co-channel interference. Additionally or alternatively, the systems and methods so employed provide determination of which network RSs within a particular cell may be operated simultaneously with tolerable co-channel interference. Accordingly, the present invention operates to determine resource (antenna beam, RS, communication channel, and the like) utilization sequences and combinations (resource utilization solutions) adapted to provide optimal capacity, desired quality/priority of service, and/or like considerations.

In a preferred embodiment, determination of resource utilization solutions in which particular resources may be utilized includes the provision of a database or matrix of a particular cell's resources for which simultaneous use is prohibited. In an alternative embodiment, this database includes additional information such as resource utilization solutions in which particular resources which, although causing undesired results such as co-channel interference, may be utilized at a diminished or reduced capacity. The capacity of a particular cell is optimized according to a preferred embodiment of the present invention by considering signal quality measurements, such as signal to noise ratio (SNR) and/or signal to interference ratio (SIR), as well a capacity needs for each RS in the cell. Accordingly, various resource utilization solutions may be analyzed with reference to the preferred embodiment database in order to determine a resource utilization solution which provides a desired level of service, whether based on capacity (in either or both the forward and reverse links), quality of service, and/or the like.

According to the present invention, given proper interference conditions, simultaneous use of two or more antenna beams with a same communication channel is possible. Moreover, where good beam isolation is present, reuse factors of three and four within a single cell are easily achievable according to the present invention.

Additionally or alternatively, the systems and methods of the present invention operate to determine inter-cell interference. The preferred embodiment of the present invention employs systems and methods for determining the amount of interference caused to RSs outside of the area outside of a cell associated with a particular BS. Preferably a database or matrix of mutually exclusive beam pairs between a home BS and an adjacent BS, or the BSs surrounding the home BS, is developed. In an alternative embodiment, this database includes additional information such as particular beam pairs which, although causing undesired results such as co-channel interference, may be utilized at a diminished or reduced capacity.

In order to allocate particular antenna beams of the above mentioned inter-cell pairs of antenna beams among the BSs of a network, a preferred embodiment of the present invention utilizes a reference clock, such as that provided by the global positioning system (GPS), available at interfering ones of the BSs. Additionally or alternatively, embodiments of the present invention may utilize inter-cell communications to coordinate use of particular inter-cell interfering pairs of antenna beams. For example, antenna beams of an inter-cell interfering pair of antenna beams may be assigned for use at a first BS on a first come first served basis, using inter-cell BS communications to notify another BS of use of an antenna beam of the inter-cell interfering pair.

Accordingly, the preferred embodiment of the present invention examines various combinations of the cell and inter-cell databases, and/or other available BS/RS/beam/channel information, to determine a resource utilization solution which provides a desired level of service, whether based on capacity (in either or both the forward and reverse links), quality of service, and/or the like. Preferably, all BS, beam, channel pairings are examined and assignments with respect to simultaneous usage are made to those pairs that provide a signal quality measurement, such as SIR, that just exceeds a threshold determined to provide a desired quality of service. Accordingly, the greatest number of uses/reuses of the spectrum may be used to provide optimization.

Preferred embodiments of the present invention utilize time division multiple access (TDMA) communication channels to allow time sharing of RF channels among multiple users. Accordingly, the present invention may use the preferred embodiment multi-beam architecture (MBA) to switch or direct energy to the proper antenna during the proper time slot to achieve system optimization as discussed above. Moreover, where bandwidth is available, multiple carriers may be simultaneously utilized in the multiple antenna beams to provide additional capacity.

Additionally, or Alternatively, embodiments of the present invention utilize CDMA communication channels to allow code sharing of RF channels among multiple users. For CDMA systems, the greatest efficiency occurs when transmission and reception between a BS and RS occur only on a single beam. Accordingly, embodiments of the present invention using CDMA, or other interference limited channels, acquire and identify the strongest received signal beam from an individual BS, such as by performing a correlation of the target RS on all BS antenna beams. Thereafter, the present invention may use the MBA to switch or direct energy to particular antenna beams to achieve system optimization as discussed above.

Variable data rates are used in a preferred embodiment of the present invention. Accordingly, higher data rates may be provided between a BS and particular RSs, where conditions allow. For example, in the above described CDMA embodiment higher capacities may be achieved through increased reuse and/or coding gain decrease. RSs disposed relatively close to a BS (RSs experiencing low path loss between the BS and RS) do not require highly spread codes to achieve low error rate data. Accordingly, allowing higher bit energy to noise density ($E_b/N_o$) for RSs which require little power can be traded for a slight rise in $E_b/N_o$ for other RSs. Having a higher $E_b/N_o$ allows changing spreading codes to get higher throughput according to one embodiment of the present invention.

Similar concepts are applied in TDMA system of the present invention. Specifically RSs which are disposed relatively close to a BS, or otherwise receive a strong signal, can operate at a reduced power level and/or establish a link with a higher data rate. For example, quadrature amplitude modulation (QAM) is an example of modulation where the same bandwidth, i.e., the same baud rate, provides multiple levels of modulation. Various orders of QAM are utilized according to one embodiment of the present invention to obtain higher throughput.

As described above, in a preferred embodiment of the present invention, restrictions exist on the simultaneous use of two or more antenna beams in a cell using a same channel. Accordingly, sectors may be established which define channel sets and/or antenna beams which may be used simultaneously. The highest capacity is likely to be achieved when each sector carries an equal share of the data traffic. Accordingly, a preferred embodiment of the present invention provides for variable sector boundaries to allow dynamic adjustment of sectors depending on traffic conditions on an entire cell.

As described above, the present invention provides a robust, spectrally efficient system and method to provide voice and high rate data on demand to multiple geographically dispersed users. A technical advantage of the present invention is that efficient use of available frequencies may be made in providing high data rate communications. A further technical advantage is provided in determining which antenna beams and which RSs can operate simultaneously with tolerable co-channel interference in order that optimal capacity may be achieved.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
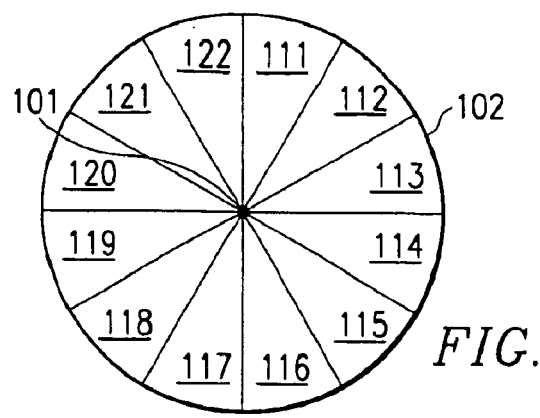
FIG. 1 shows a preferred embodiment multiple beam cell utilized according the present invention.

The present invention is directed to a wireless system capable of providing several megabit channels at a plurality of base stations (BSs) in a communication network while using only a few RF channels. According to the preferred embodiment of the present invention, a relatively small amount of spectrum is utilized by the present invention in providing high data rate communications to a number of geographically dispersed remote stations (RSs). In order to provide a desired high data rate (high data bandwidth) in the available spectrum to multiple users in an efficient and economical manner, reuse of frequencies and/or other communication channels is preferably utilized. In the preferred embodiment, multiple antenna beams are provided in order to facilitate the reuse of communication channels at a cell and/or within the communication network.

A preferred embodiment of the present invention uses TDMA to time share a single resource (frequency, channel, etcetera) among multiple users. In utilizing TDMA techniques with the MBA of the preferred embodiment, a switch or other controllable circuitry is used to direct energy to the proper antenna beam during the proper time slot. Alternatively, an adaptive antenna may "point" an antenna beam directly at each user and quickly re-point to another user. This has more complex circuitry, but works the same for systems where any one antenna beam needs only a fraction of the system capacity, such solutions are very efficient. It should be appreciated that in an adaptive array one such adaptive antenna beam may be utilized to provide signals in various azimuthal angles as well as a variety of radiation pattern shapes. Accordingly, multiple beams and multiple beam antennas as used herein includes an adaptive array providing a single antenna radiation pattern at any one instant, as well as those providing multiple simultaneous antenna beams.

Hybrid systems, wherein both adaptive arrays and fixed beam arrays are used, may be utilized according to the present invention. For example, a preferred embodiment of the present invention utilizes an adaptive array (or feed network coupled to a common antenna array) on the uplink and a fixed beam array (or feed network coupled to the common antenna array) on the downlink. Accordingly, selection of a downlink antenna beam to use may be made from the uplink signals to provide a system which adapts on a per user basis for the uplink and selects one of N fixed beams for downlink transmission.

Growth scenarios with multibeam TDMA are simple. For example, initial deployment may begin with one RF carrier per BS. Thereafter as demand dictates, and where bandwidth is available, another carrier may be delegated to the BS. Using linear power amplifiers (LPAs), multiple carriers may be communicated through the same antenna beam simultaneously. Alternatively, restricting usage to different antenna beams for different carriers may avoid the use of LPAs, although such a configuration reduces flexibility and throughput. If neighboring BSs in a communication network have different RF channels, then growth at each BS, as well as the utilization of the RF channels, proceeds independently. However, according to a preferred embodiment of the present invention, reuse of channels, both within a cell and throughout neighboring cells, is utilized according to resource utilization solutions which may be optimized to achieve increased capacity and/or desired levels of throughput, quality of service, etcetera.

A preferred embodiment of the present invention uses CDMA to code share a single resource (frequency, channel, etcetera) among multiple users. In utilizing CDMA techniques with the MBA of the preferred embodiment, the greatest efficiency occurs when transmission and reception between a BS and RS occur only on a single beam of the BS. This is because CDMA techniques are interference limited. Therefore, limiting the area in which a particular code signal is radiated will reduce the energy level experienced outside this area and, thus, allow additional capacity in these areas. Accordingly, a preferred embodiment of the present invention provides selective coupling of signals to particular antenna beams of the MBA, such as through a switch matrix or other controllable circuitry, or form multiple beams aimed at individual RSs.

BS 101 adapted according to the present invention is shown in FIG. 1 as having a set of, preferably 12, narrow antenna beams (beams 111–122) providing wireless communication within cell 102. BS 101 is preferably adapted to direct energy into and out of any antenna beam on command. A preferred embodiment of circuitry of BS 101 adapted as described above is shown in FIG. 2.

It should be appreciated that the multiple narrow antenna beams utilized according to the present invention may be provided by a multiple beam antenna array, by individual antennas adapted to provide narrow beams, or by any other means deemed desirable. Additionally, it should be appreciated that the number of antenna beams utilized according to the present invention is not limited to the 12 antenna beams illustrated. The antenna beams utilized according to the present invention may be formed from a fixed beam array (such as a Butler matrix switched beam array) or from adaptive array (such as an adaptive beam forming array using adjustable phase progressions and weighting to form antenna beams and nulls).

Moreover, embodiments of the present invention may include multiple elevation angles per antenna beam or per antenna beam azimuthal position. Accordingly, increased capacity may be achieved by further isolating the communication of signals, such as by dedicating more unique pointing slots in a signal. Communication timing may cycle through X azimuth angles at 0° and then Y azimuth angles for a next elevation angle, and so on.

Figure 2A:
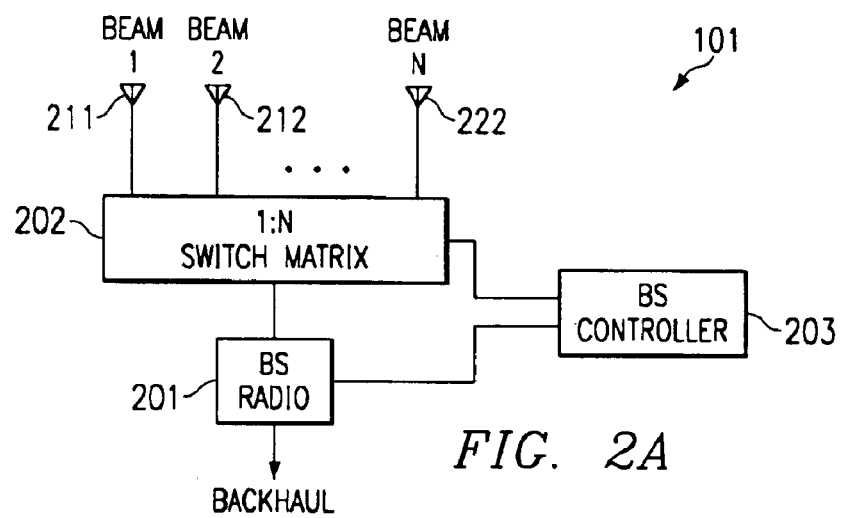
FIG. 2 shows alternative embodiments of base station circuitry of the present invention.

As shown in FIG. 2A, BS 101 includes BS radio 201 coupled to antennas 211–222 through switch matrix 202 to direct energy between any of antennas 211–222 and BS radio 201 (into and out of beams 1–N) on command. Control of switch matrix 202 and/or radio 201 is preferably provided by a processor based control system (BS controller 203), preferably having a central processing unit, memory, and a control algorithm operable therewith. It should be appreciated that BS controller 203 may be adapted to provide additional functionality such as digital signal processing (DSP), interference canceling, signal quality analysis, and the like.

According to the preferred embodiment of the present invention, simultaneous use of 2 or more antenna beams in a single cell, such as cell 102, is possible. One overriding determinant of such reuse is antenna beam isolation. Some antennas are better than others at providing isolation, but cost and size is an issue. Additional beam isolation can be obtained by using cross polarization transmission at adjacent beams. Cross polarization in a same beam is technically possible, but such an embodiment tends to cause the BS to be very expensive. Regardless of how isolation is provided, an RF carrier is preferably dedicated to a particular sector of the cell, defined as using K beams where K may be as narrow as one antenna beam or may encompass a full 360°.

Figure 2B:
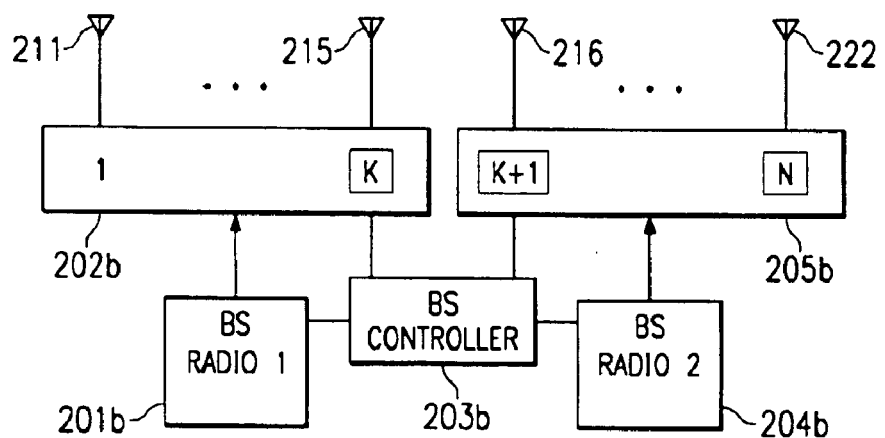
Figure 2C:
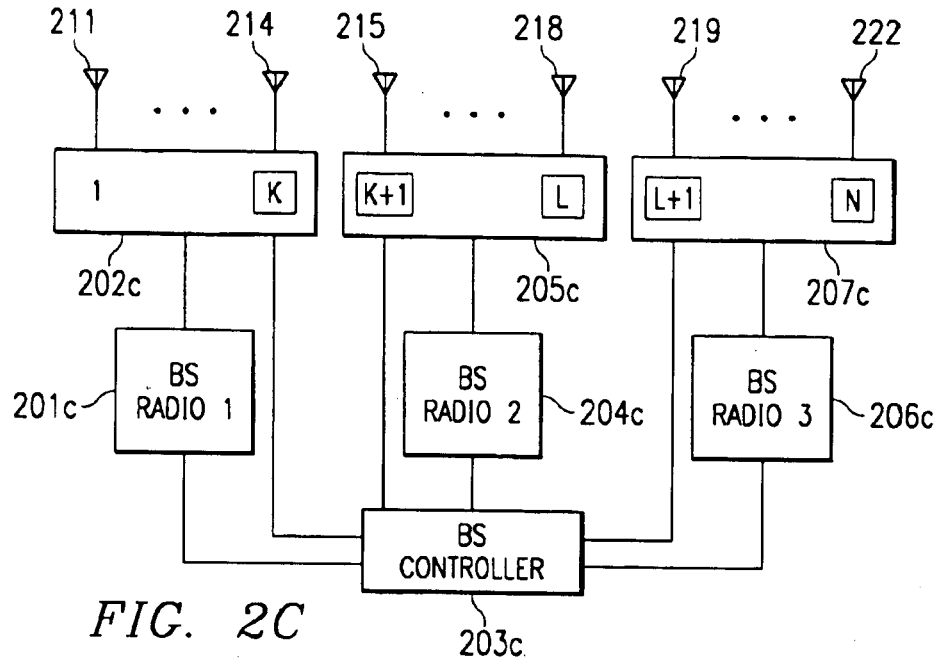
Figure 2D:
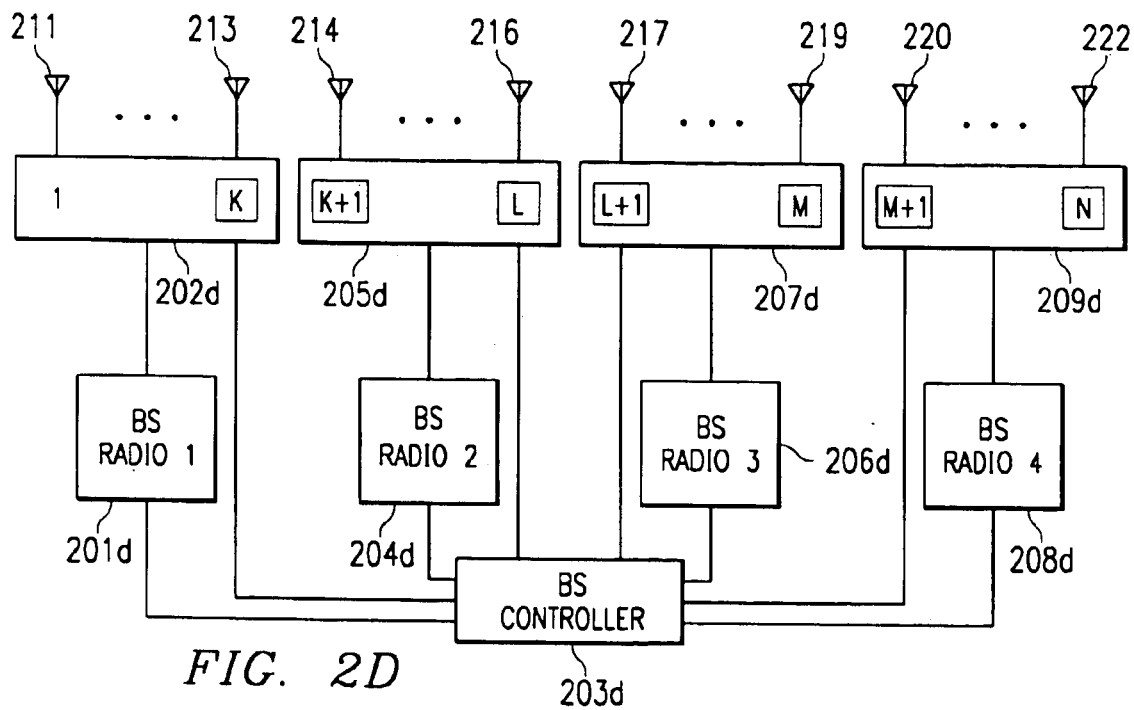

Accordingly, alternative embodiments of the circuitry of BS 101 are shown in FIGS. 2B through 2D. For example, FIG. 2B shows 2 BS radio units, BS radio 201*b* and BS radio 204*b*, coupled to antennas 211–222. However in this embodiment BS radio 201*b* is coupled to antennas 1 through k (here antennas 211–215 preferably defining a first sector) through switch matrix 202*b*, while BS radio 204*b* is coupled to antennas k+1 through n (here antennas 216–222 preferably defining a second sector) through switch matrix 205*b*. Control of switch matrixes 202*b* and 205*b* and/or radios 201*b* and 204*b* is preferably provided by BS controller 203*b*, preferably configured substantially as BS controller 203 described above.

Figure 3A:
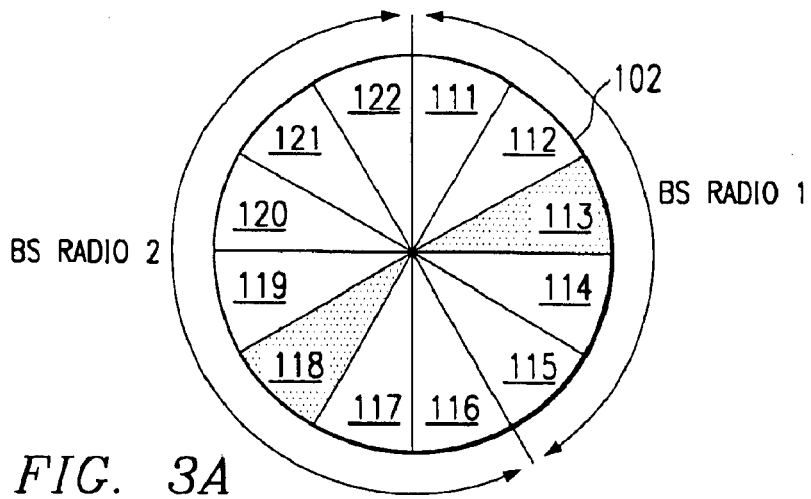
FIG. 3 shows reuse of channels by the circuitry of FIG. 2.

Each of BS radios 201*b* and 204*b* are preferably adapted to provide communications on a same channel or channels as the other one of BS radios 201*b* and 204*b*. Accordingly, as shown in FIG. 3A, a same channel may be utilized within cell 102, such as at both beam 113 associated with BS radio 201*b* and beam 118 associated with BS radio 204*b*, to provide increased communication capacity within the cell as compared with the exclusive use of available channels within that cell.

FIG. 2C shows 3 BS radio units, BS radio units 201c, BS radio 204c, and BS radio 206c, coupled to antennas 211–222. However in this embodiment BS radio 201c is coupled to antennas 1 through k (here antennas 211–214 preferably defining a first sector) through switch matrix 202c, while BS radio 204c is coupled to antennas k+1 through l (here antennas 215–218 preferably defining a second sector) through switch matrix 205c, and while BS radio 206c is coupled to antennas l+1 through n (here antennas 219–222 preferably defining a third sector) through switch matrix 207c. Control of switch matrixes 202c, 205c, and 207c and/or radios 201c, 204c, and 206c is preferably provided by BS controller 203c, preferably configured substantially as BS controller 203 described above.

Figure 3B:
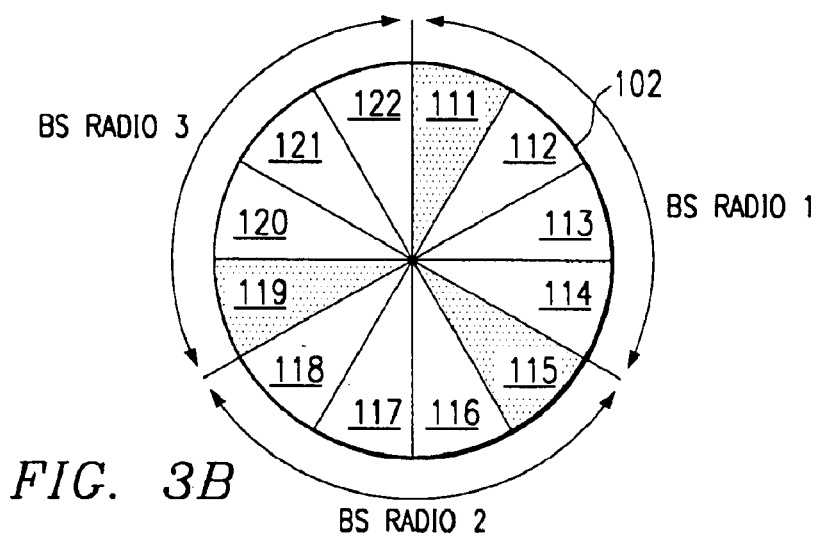

Each of BS radios 201c, 204c, and 206c are preferably adapted to provide communications on a same channel or channels as the other one of BS radios 201c, 204c, and 206c. Accordingly, as shown in FIG. 3B, a same channel may be utilized within cell 102, such as at each of beams 111 associated with BS radio 201c, 115 associated with BS radio 204c, and 119 associated with BS radio 206c to provide increased communication capacity within the cell as compared with the exclusive use of available channels within that cell.

FIG. 2D shows 4 BS radio units, BS radio units 201d, BS radio 204d, BS radio 206d, and BS radio 208d coupled to antennas 211–222. However in this embodiment BS radio 201d is coupled to antennas 1 through k (here antennas 211–213 preferably defining a first sector) through switch matrix 202d, while BS radio 204d is coupled to antennas k+1 through l (here antennas 214–216 preferably defining a second sector) through switch matrix 205d, while BS radio 206d is coupled to antennas l+1 through m (here antennas 217–219 preferably defining a third sector) through switch matrix 207d, and while BS radio 208d is coupled to antennas m+1 through n (here antennas 220–222 preferably defining a fourth sector) through switch matrix 209d. Control of switch matrixes 202d, 205d, 207d, and 209d and/or radios 201d, 204d, 206d, and 208d is preferably provided by BS controller 203d, preferably configured substantially as BS controller 203 described above.

Figure 3C:
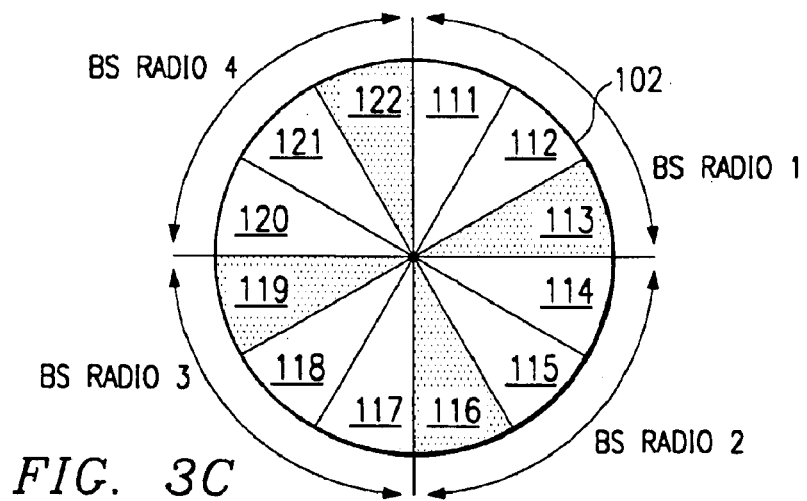

Each of BS radios 201d, 204d, 206d, and 208d are preferably adapted to provide communications on a same channel or channels as the other one of BS radios 201d, 204d, 206d, and 208d. Accordingly, as shown in FIG. 3C, a same channel may be utilized within cell 102, such as at each of beams 113 associated with BS radio 201d, 116 associated with BS radio 204d, 119 associated with BS radio 206d, and 122 associated with BS radio 208d to provide increased communication capacity within the cell as compared with the exclusive use of available channels within that cell.

It should be appreciated that the use of separate radios and/or separate switching circuits is not required according to the present invention. For example, radio circuitry capable of providing separate communications on a same channel to multiple RSs may be utilized according to the present invention. In addition to there being no limitation that separate switching circuitry or radios be used, there is no limitation to the use of particular antenna beams with particular radios and/or channels according to the present invention. For example, multiple radios may be coupled to a switching array allowing connection of any radio to any antenna beam, alone or in combination, if desired.

Additionally, it should be appreciated that, as shown in the embodiment of FIGS. 2B and 3A, there is no limitation to there being an equal number of antenna beams associated with radios, channels, or other resources, according to the present invention. Likewise, there is no limitation to the antenna beams being the same size, or even of a fixed size, according to the present invention.

The highest capacity will generally be achieved when each sector of a BS carries a substantially same traffic load and/or cells of the network carry a substantially same traffic load. Accordingly, a preferred embodiment of the present invention utilizes variable sector boundaries to allow loading to be balanced between the sectors. For example, during particular parts of a day or week particular RSs may require more data capacity than other times of the day or week. If changes in required data capacity are not substantially uniformly distributed amongst the sectors, a switching matrix or other controlled coupling circuitry may be utilized to adjust the coupling of antenna beams to communication equipment, such as traffic channel radios, pilot radios, and the like, to redefine sector boundaries, such as those described above with respect to FIGS. 2B–2D. Systems and methods for providing dynamic adjusting of sector sizes utilizing multiple antenna beams are shown and described in U.S. Pat. No. 5,889,494, the disclosure of which is incorporated herein by reference.

In addition to operational determinations made with respect to traffic in various sectors of a BS as described herein, a preferred embodiment of the present invention utilizes inner cell communication/control to optimize operations. For example, the above described load balancing may be accomplished at least in part through handing communications off to an adjacent cell. Additionally or alternatively, such inter-cell communication/control may be utilized to provide network load balancing. Systems and methods for providing such inter-cell communication/control are shown in U.S. Pat. No. 5,884,147, entitled "Method and Apparatus for Improved Control over Cellular Systems," the disclosure of which is incorporated herein by reference.

Experimentation has revealed that a BS which can select the most preferred one of 12 narrow antenna beams which cover a service area, as compared to an omnidirectional antenna covering the same service area, has an 11 dB advantage in terms of interference rejection and power transmitted. Even more benefits in terms of reduced interference and radiated power occur when the RS is capable of directing a narrow beam antenna toward the best servicing BS. Accordingly, the greatest efficiency in the use of available resources according to a preferred embodiment of the present invention occurs when transmission and reception between a BS and RS occur only on a single antenna beam of the BS. According to a preferred embodiment, a most preferred antenna beam for communications with each active RS is identified and subsequent communication occurs using this most preferred antenna beam. Preferably, the most preferred antenna beam for each RS is an antenna beam having a "strongest" signal associated with that RS. It should be appreciated that the antenna beam determined according to the present invention to be the "strongest" may meet criteria other than or in addition to the received signal strength of greatest magnitude. For example, the determination of "strongest" may be made for an antenna beam having the best signal quality, i.e., highest SIR or SNR, the most direct path or shortest path, or the like. Likewise, an adaptive beam former can create a "strongest" beam to the RS using similar criteria.

A difficulty in using multiple beam antennas is in the initial assignment and subsequent tracking of the best serving base station and the most preferred antenna beam associated therewith. The difficulty is exacerbated in TDMA system, where it becomes important to know both when and where antenna beams are pointing and the distance between the BS and RS. To some extent utilizing an omnidirectional antenna beam can aid in acquisition, but the use of an omnidirectional antenna beam in combination with the multiple antenna beams adds to the complexity of both the BS and the RS and typically would not provide information with regard to selection of a most preferred antenna beam. Therefore, the preferred embodiment of the present invention provides a technique to initialize and track multibeam antennas at both a BS and RS without using omnidirectional antennas.

Figure 9:
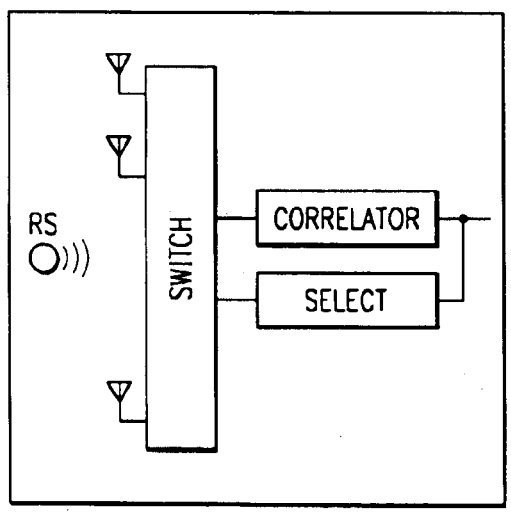
FIGS. 9 and 10 show preferred embodiment circuitry for the acquisition of most preferred antenna beams.
Figure 10:
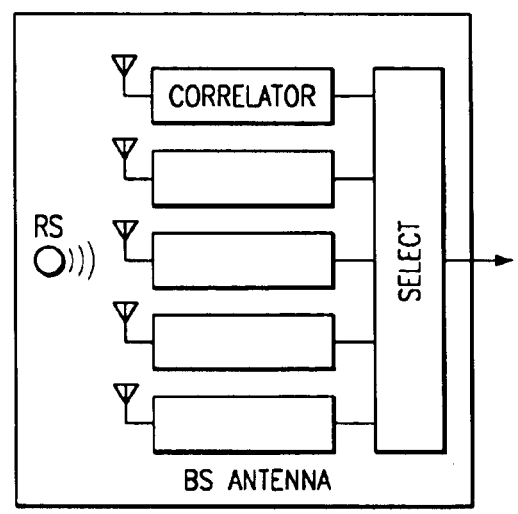

Acquiring and identifying the most preferred antenna beam at the BS is preferably performed by the BS correlating the target RS on all antenna beams, or some subset thereof determined to be candidates for establishing communications with the target RS. Since "strongest" antenna beams rarely change in a fixed point communication system, as opposed to mobile cellular systems where the strongest antenna beam can potentially change several times per second, determining the correct antenna beam for a fixed RS is not generally a time critical issue. Shown in FIG. 9 is preferred embodiment circuitry adapted to provide time shared acquisition of most preferred antenna beams. Accordingly, correlation circuitry is provided which is coupled to the multiple antenna beams through a switch matrix, allowing antenna beams to be selectively provided to the correlator for determination of a most preferred antenna beam.

Where determination of a most preferred antenna beam is more time critical, such as where ones of the RSs are likely to change position and/or where propagation conditions are subject to material change, the simultaneous acquisition circuitry of FIG. 10 may be more desired. In the embodiment of FIG. 10, each antenna beam is provided with associated correlation circuitry in order to allow simultaneous acquisition of a signal on all antenna beams.

According to a preferred embodiment, where timing is divided into bits, slots, frames, superframes, etcetera, with $N_1$ bits/slot, $N_2$ slots/frame, $N_3$ frames/superframe, etcetera, initialization occurs using a dedicated multiple beam antenna access channel (MBAACH). A preferred embodiment MBAACH data container is shown in FIG. 11 as packet 1100.

Figure 11:
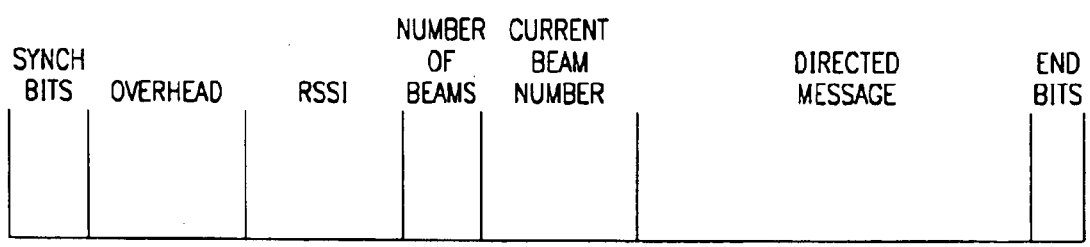
FIG. 11 shows a preferred embodiment data container for a forward link access channel.

The preferred embodiment MBAACH data container of FIG. 11 includes synch bits, overhead information, RSSI information, number of antenna beams, current antenna beam, and directed message. The synch bits of the preferred embodiment set the beginning of the MBAACH message. The overhead information includes information such as system identification, number of carriers, BS identity, timing information, etcetera. The RSSI information is information designed to allow the quick determination of received signal strength. The number of antenna beams information provides information regarding the number of antenna beams associated with this carrier and, preferably, the pointing angles of these antenna beams. The current antenna beam information provides the current antenna beam number and pointing angle. The directed message provides instructions to individual RSs.

Preferably, the MBAACH is provided in a slot of a traffic channel. Accordingly, one slot of the traffic channel is dedicated to beam acquisition, paging, and slot assignment. The frequency of occurrence of a MBAACH slot depends on the number of users and the desired set-up time.

Figure 12:
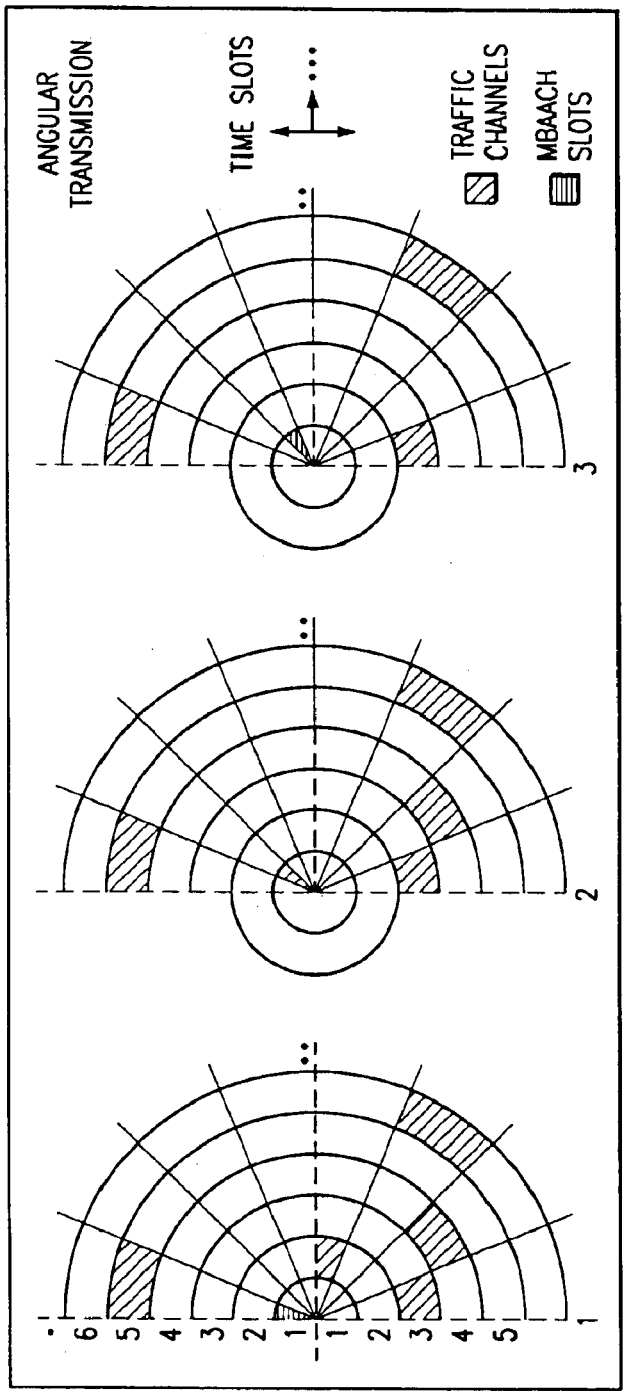
FIG. 12 shows progression of the forward link access channel through a preferred embodiment multiple beam antenna.

In operation according to a preferred embodiment, a BS is aligned with antenna beam 1 facing north, antenna beam 2 facing north easterly, etcetera as illustrated in FIG. 1. Preferably, for the MBAACH, slot 1 corresponds to the MBA pointed in direction 1, in the next repetition of the MBAACH slot, the MBA would point in direction 2, etcetera. The progression of the MBAACH slots according to this embodiment of the present invention is shown in FIG. 12.

According to the preferred embodiment, the RS listens for the synch burst and attempts to measure the signal strength. Most of the time the RS will measure low values for the signal strength. As the MBA points toward the RS, the signal strength will increase. If the RS also has a MBA, then after every K frames, corresponding to the BS having stepped through every pointing angle or every pointing angle associated with a particular carrier, the RS will preferably increment its MBA by one antenna beam and repeat the search. Preferably, after exhausting all angels, the RS increments to the next RF carrier. The RS preferably logs the carrier numbers and the beam numbers that produce a strongest receive signal strength, for example a first and second most preferred carrier and beam combination may be determined. Thereafter the RS preferably adjusts its antenna beam angle to the strongest BS and transmits in the time slot reverse link dedicated to MBA access channel (reverse MBAACH) information regarding the most preferred carrier and beam combination. For example, the RS locks onto the best carrier, antenna beam, receive signal strength combination and transmits the reverse MBAACH to the appropriate BS.

Figure 13:
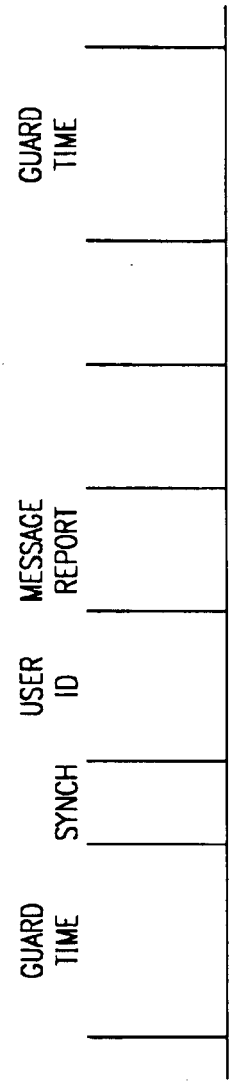
FIG. 13 shows a preferred embodiment data container for a reverse link access channel.

A preferred embodiment reverse MBAACH data container is shown in FIG. 13. The preferred embodiment reverse MBAACH data container of FIG. 13 includes a leading and trailing guard time, synch bits, RS identification information, and report message. The guard times are adapted to prevent the RS from accidentally transmitting and overlapping its transmission with other RSs, i.e., the guard band insures that messages from distant RSs arrive within the time window of a time slot and do not overlap with other RSs on adjacent slots. The synch bits of the preferred embodiment set the beginning of the reverse MBAACH message. The RS identification information identifies the RS sending the reverse MBAACH message. The report message provides information such as carriers detected, angles and beam numbers above threshold, etcetera.

After having provided the appropriate information in the reverse MBAACH, the RS listens on a direction MBAACH portion of the channel, corresponding to the beam number used, for a unique message. The received direction message of a preferred embodiment may instruct the RS that the identified best carrier, angle and beam is acceptable for communication or, if unavailable, perhaps to look for another BS or RF carrier.

Figure 14:
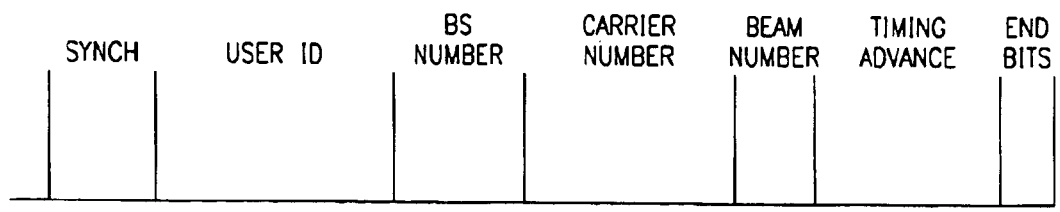
FIG. 14 shows a preferred embodiment data container for a direction message.

A preferred embodiment of the direction message from the BS is shown in FIG. 14. The preferred embodiment direction message includes synch bits, RS identification information, BS identification information, carrier number, antenna beam number, timing advance information, and end bits. The synch bits of the preferred embodiment set the beginning of the direction message. The RS identification information identifies the RS to which the direction message is directed. The BS identification information identifies the BS from which the direction message was sent. The carrier number identifies the carrier to which the direction message relates. The beam number identifies the beam to which the direction message relates. The timing advance information provides timing information related to the RSs relative position to the BS in order to allow reduced reliance on guard times in communication of data packets. The end bits set the end of the direction message.

In the preferred embodiment, operation of the present invention in initializing antenna beams, carriers, and the like as described above, includes protocols for handling messages which are corrupted or collide. For example, each RS may be assigned a particular reverse MBAACH time slot in order to avoid collisions in providing the reverse MBAACH message. Additionally or alternatively, the RS may wait for a particular predetermined time for a direction message from the BS and if not received therein, retransmit the reverse MBAACH message due to its having collided with another message or otherwise having been corrupted as received at the BS.

It should be appreciated that the above described initialization technique allows MBA antennas at both the BS and the RS to align themselves. Moreover, such alignment may be accomplished prior to, and independent of, any other application.

For forward links it is often customary to use a pilot signal, different at each BS, so that a RS can identify the BS with the best or most preferred signal path. In a preferred embodiment, the forward and reverse path antenna beams are selected to be the same, since it is likely the forward and reverse links will experience the same or similar propagation conditions. Accordingly, in the preferred embodiment either the BS or RS may be equipped to determine the most preferred antenna beam for each.

For a single cell, such as that shown in FIG. 1, beam-to-beam isolation is an important factor in determining the cell capacity, as the ability to reuse a communication channel of BS radio 201 simultaneously in any of beams 1–N depends on the ability of the antenna beams to isolate the signal from other ones of beams 1–N. Isolation in free space can be increased through the use of improved antenna designs, such as designs which provide lower sidelobes, reduced back scatter, and the like. However, in practice scattering around the BS and RSs causes unwanted energy to appear in beams other than that intended. Scattering near the BS can be reduced by raising the BS above local obstacles, however this is not always practical due to zoning and other restrictions. Scattering around the RS can be reduced by using directive antennas pointing toward the BS. The present invention will operate with some or all of the RSs having omnidirectional or broad beam antennas. However, in order to provide higher system capacity, the preferred embodiment of the present invention uses directive antennas at some or all RSs. Accordingly, a preferred embodiment RS according to the present invention utilizes a multibeam antenna substantially as shown in FIG. 1.

In order to provide communication services to a number of RSs disposed throughout a geographic area, the preferred embodiment of the present invention utilizes a plurality of BSs such as BS 101 of FIG. 1 to establish a cellular communication network. The system preferably determines a BS which a RS should be served by through reference to existing and learned network conditions. For example, reference may be made to traffic patterns, interference conditions, loading, and the like. Additionally or alternatively, signal strength maybe utilized in determining a BS to serve a particular RS.

Figure 4:
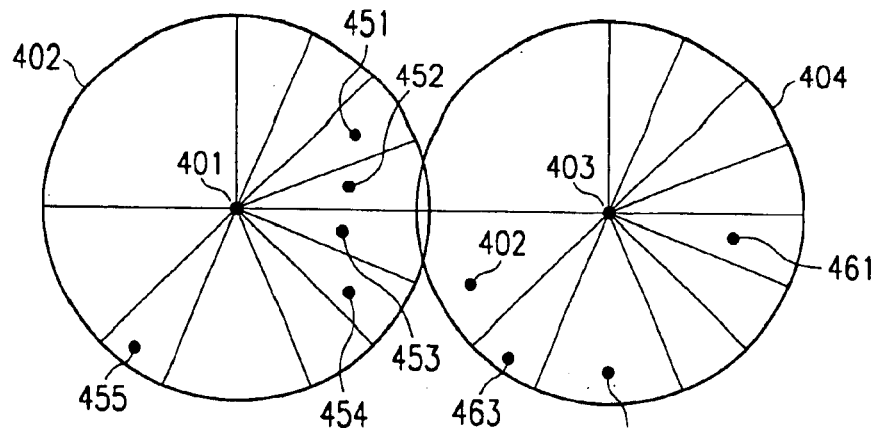
FIG. 4 shows a network of cells according to the present invention.

A simple multibeam BS network is illustrated in FIG. 4. It should be appreciated from the network of FIG. 4 that the antenna beams utilized according to the present invention are not limited to a particular number or even a particular size. As shown in FIG. 4, various size antenna beams may be utilized, such as where RSs within a cell are not evenly distributed and thus loading on the various antenna beams may be balanced. BSs 401 and 403 of FIG. 4, preferably each configured substantially as illustrated in FIG. 2, are deployed to provide communication services within cells 402 and 404 respectively. Disposed at various positions throughout cells 402 and 404 are RSs 451–455 (cell 402) and 461464 (cell 404) being provided communication services by BSs 401 and 403. The communication services provided to these RSs include high rate data services, such as 1 MB/s data communications. However, as the RF spectrum is limited and expensive, operation of the present invention efficiently utilizes the available spectrum to provide each of the RSs the desired communication services.

As the designs of most practical antennas trade physical size and other practical considerations against beam-to-beam isolation, it is assumed that adjacent antenna beams of an antenna system utilized according to the present invention will couple too much energy to carry separate independent signals of a same communication channel. Therefore, according to a preferred embodiment of the present invention, adjacent beams are not allowed to transmit a same communication channel simultaneously. Although this restriction may be avoided by cross-polarization or other isolation techniques, but such an embodiment may require RSs to have dual polarity antennas which would tend to increase their cost. For example, referring to FIG. 4, at BS 401 RSs 451, 453, and 455 or 452, 454, and 455 may be served with the same channel simultaneously. However, RSs 452 and 453 would not be served with the same channel simultaneously because it is expected that the antennas utilized at BS 401 cannot provide sufficient signal isolation.

It should be readily appreciated from the illustration in FIG. 4, that the problems of co-channel interference are not limited to communications associated with BS 401. For example, RS 453 of BS 401 and RS 462 of BS 403, if simultaneously operating on a same communication channel may experience co-channel interference. However, depending on the relative power levels at RSs 453 and 462, and the discrimination of the RS antennas, co-channel interference at RSs 453 and 462 may be limited or avoided. Accordingly, a preferred embodiment of the present invention utilizes directional antennas at some or all of the RSs. Such directional antennas may, for example, be a single narrow beam focused on a particular BS or may be a multiple beam array such as illustrated in FIG. 1 suitable for establishing communication with multiple network BSs.

In addition to the above described co-channel interference associated with RSs which, although being disposed in different cells, are located in relative close proximity, more distant RSs may too experience co-channel interference. For example, RS 461 may "see" BS 401, i.e., receive a signal from BS 401 with sufficient amplitude to cause undesired results at RS 461, when BS 401 transmits to RS 453. However, if the signal from BS 403 to RS 461 is sufficiently strong, then both RS 453 and RS 461 can operate simultaneously on a same communication channel according to the present invention. It should be appreciated that various network parameters may be adjusted to allow the signal between BS 403 and RS 461 to be sufficiently strong to allow the simultaneous operation of RSs 453 and 461. For example, the power level of a signal transmitted from BS 401 to RS 453 may be reduced to a level sufficiently low for simultaneous operation of RS 461, while sufficiently high to provide a desired quality of service at RS 453. Additionally or alternatively, the power level of a signal transmitted from BS 402 to RS 461 may be increased to a level sufficiently high for simultaneous operation of RSs 461 and 453, while sufficiently low to avoid causing undesired results in other communication links of the network.

A preferred embodiment of the present invention operates to determine which network resources, i.e., which antenna beams and RSs, may be operated on a same channel simultaneously with tolerable co-channel interference so that optimal capacity can be achieved in the network. Preferably, such determinations are made on various system levels, such as determinations with respect to each BS considered alone (intra-cell interference) and determinations with respect to RSs outside the coverage area of each BS (inter-cell interference).

The discussion below with respect to the determining of acceptable simultaneous use of network resources assumes previously measured and/or well modeled radiation paths, e.g., empirically measured communication attributes (whether during live communications or during a test period) and/or computer modeling of interference conditions based upon know propagation characteristics. It should be appreciated that such measurements may be incorporated as an integral part of the communication network and would require only a small fraction of the network capacity to keep current. For example, BS 101 as illustrated in FIG. 2 may include a signal quality, or other attribute, measurement apparatus, such as a receive signal strength indicator (RSSI), SNR, and/or SIR measurement device, disposed in the signal path between BS radio 201 and switch matrix 202 to measure the signals coupled thereto. Additionally or alternatively, each of the antenna beams 1–N may be switchably coupled to such a measurement apparatus, such as through a port on switch matrix 202 or through inclusion of a second switch matrix, to allow selection of antenna beams for signal quality measurement independent of the operation of radio 201. Similarly, each or ones of the RSs may include signal quality measurement apparatus. Several techniques allow individual RSs a way to report their measurements. For example, in TDMA systems polling, slotting, time assigned and/or random reporting, with repeats if collisions occur, are all techniques which may allow an RS a clear time slot to report.

The signal attribute information may be communicated to a centralized processor operable to control or otherwise process information for all or several of the BSs. Additionally or alternatively, this information may be utilized at each of the BSs, such as by the above described BS controller, to control operation of the BS.

In a preferred embodiment of intra-cell interference determinations it is assumed that each RS is aimed at the BS that provides the greatest strength signal, such as using the steps described above. Accordingly, a communication path may be set up so that from time to time each RS logs onto the network and identifies what BS and what beam provides the strongest signal thereto. Of course, it should be appreciated that the use of multiple antenna beams at the RSs is within the scope of the present invention and, thus, an antenna beam aimed at the BS may be but one of a plurality of RS antenna beams (others of which may be aimed at other BSs). Similarly, omni directional antenna beams at the RS are within the scope of the present invention and, thus, aiming of such a beam may correspond to deployment such that communications are possible.

Figure 5A:
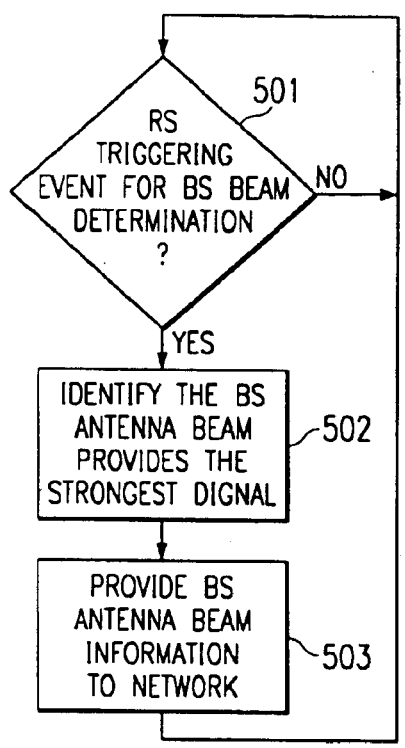
FIG. 5 shows flow diagrams of the identification of antenna beams for communication at remote stations and at base stations.

Directing attention to FIG. 5A, an algorithm operable to cause RSs to periodically identify and provide BS antenna beam selection information to the network is shown. This algorithm is preferably operable on a processor based system of the RS and provides control of the RS to identify the desired antenna beam information and provide this information to a corresponding network system, such as the aforementioned BS or network controller. Specifically, at step 501 a determination is made as to whether an antenna beam determination event has occurred. This event may be a predetermined time period, a threshold amount of data communication having been accomplished, a threshold data error rate (such as a bit error rate (BER)), a predetermined signal quality level not having been maintained, or the like. If the triggering event has not transpired, then processing loops back to step 501 to forego further antenna beam determination processing until the event has transpired.

If the triggering event has transpired, processing continues to step 502 where the BS antenna beam providing the a most desired signal attribute, such as a strongest signal, is identified. A preferred embodiment technique providing identification of a BS antenna beam and/or RS antenna beam according to the present invention is described in detail above with respect to the MBAACH.

It should be appreciated that identification of a BS antenna beam at step 502 is not limited to a best or most desired antenna beam. Accordingly, a determination may be made as to whether the RS receives energy above an interference threshold on BS antenna beams other than the strongest BS antenna beam. For example, a first and second best antenna beam may be identified in order to readily identify an alternative communication link in case of communication anomaly or in order to select optimized resource utilization solutions. Likewise, identification of a BS antenna beam at step 502 may encompass a determination of various ones of multiple RS antenna beams the signal of a particular BS antenna beams is/are best or otherwise desirable.

After a BS antenna beam has been identified at step 502, processing continues to step 503. At step 503 information regarding the BS antenna beam is provided to the network. As discussed above, this information may be provided to the "home" BS for that particular RS, it may be provided to a centralized controller, or the like. Irrespective of the particular network element to which the information is provided, after submitting the information to the proper network element processing loops back to step 501 to await the next occurrence of a determination triggering event.

According to the preferred embodiment, each BS logs the signal strength or other signal attribute from the RSs operable therewith (preferably the RSs located in a cell associated therewith, and alternatively including the RSs disposed in a position suitable for establishing communications of a desired signal quality therewith) on various antenna beams of that BS. Preferably logging of RS signal attributes are for each antenna at the BS so as to determine the interference levels likely to be experienced with simultaneous communication with another RS in any area of the cell.

Figure 5B:
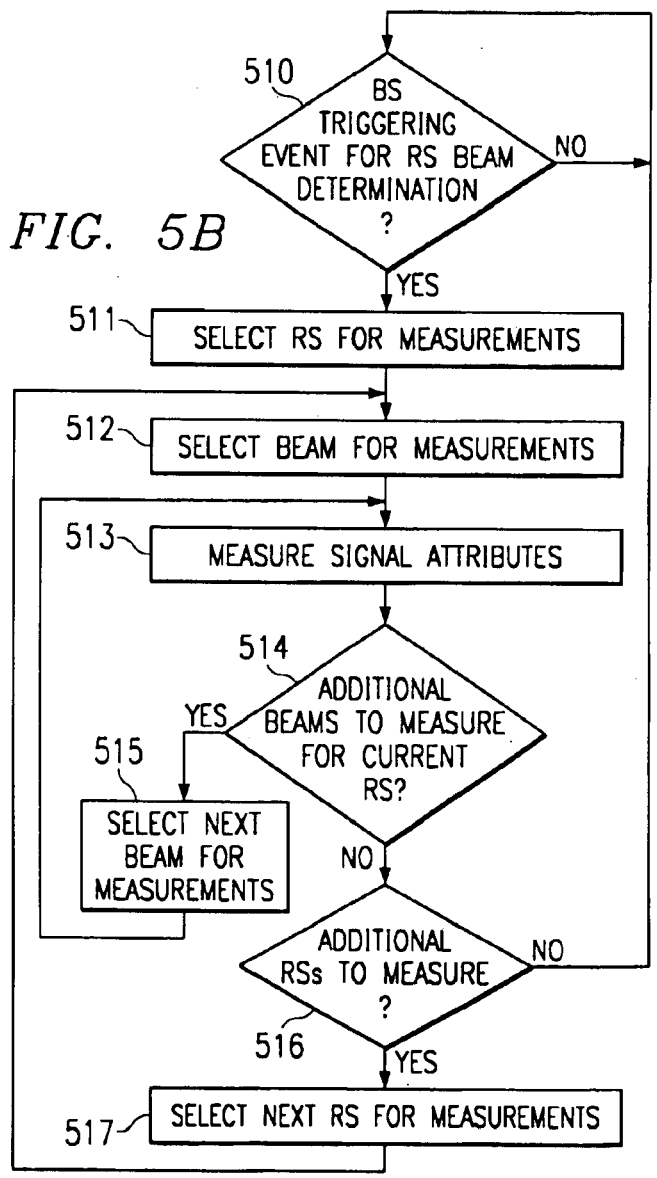

Directing attention to FIG. 5B, an algorithm operable to cause BSs to periodically measure signal attributes associated with RSs in communication therewith (or for which communication therewith is possible) is shown. This algorithm is preferably operable on a processor based system of the BS, such as the above described BS controller. The information measured may be retained by the BS and/or provided to other network systems if desired.

At step 510 a determination is made as to whether a triggering event has transpired for the determining of RS beam information. This event may be a predetermined time period, a threshold amount of data communication having been accomplished, a threshold data error rate (such as a BER), a predetermined signal quality level not having been maintained, or the like. If the triggering event has not transpired, then processing loops back to step 510 to forego further antenna beam determination processing until the event has transpired.

If the triggering event has transpired, processing continues to step 511 where an RS is selected for signal measurements. As previously mentioned, the RS may be selected from those RSs disposed within the cell associated with the BS or RSs capable of communications with the BS (i.e., RSs disposed within or relatively near the BS). Additionally or alternatively, RSs may be selected from a subset of those RSs meeting a particular criteria, such as those experiencing a particular error rate, signal quality, data throughput, or the like.

After selection of the RS for measurement a first antenna beam of the multiple BS antenna beams is selected for measurement with respect to the selected RS (step 512). Of course, it should be appreciated that there is no limitation to the particular order of selection of the RS and antenna beams according to the present invention. Accordingly, the present invention is not limited to the order of steps illustrated in the preferred embodiment.

At step 512 the antenna beam is preferably selected from all the BS antenna beams so as to provide for measurement of signal attributes associated with the selected RS on each BS antenna beam. In alternative embodiments selection of the antenna beams may be from a subset of available antenna beams, such as only those likely to receive a signal of consequence from the selected RS based on modeling predictions.

After selection of the BS antenna beam for measurement has been made, processing proceeds to step 513 where desired signal attributes of the selected beam with respect to the selected RS are measured. As discussed above, the measured signal attributes may include RSSI, SNR, SIR, BER, and/or the like.

Thereafter, a determination is made as to whether there are additional BS antenna beams for which measurements with respect to the currently selected RS are desired (step 514). If there are additional BS antenna beams for which measurements are desired, such as if all BS antenna beams or the BS antenna beams of a preselected subset have not been measured for the selected RS, processing proceeds to step 515.

At step 515 a next BS antenna beam of the antenna beams for which measurements are to be made is selected. Thereafter processing proceeds again to step 513 for measurement of the signal attributes.

If at step 514 a determination is made that no additional BS antenna beams are to be measured with respect to the currently selected RS, processing continues to step 516. At step 516 a determination is made as to whether there are additional RSs for which measurements are desired. If there are additional RSs for which measurements are desired, such as if all RSs within the cell or in communication with the BS have not been measured, processing proceeds to step 517.

At step 517 a next RS of the RSs for which measurements are to be made is selected. Thereafter processing proceeds again to step 512 for selection of a first BS antenna beam for measurement.

If at step 516 a determination is made that no additional RSs are to be measured, processing returns again to step 510 to await a measurement triggering event.

After inter-cell interference data is determined, preferably using the algorithms discussed above, the preferred embodiment of the present invention operates to create a forbidden beam matrix. Such a matrix is preferably created for each BS individually, such as one for BS 301 of FIG. 4 and another for BS 403 of FIG. 4. An example of a portion of a forbidden beam matrix is illustrated in the table below.

|        | Beam 1 | Beam 2 | Beam 3 | Beam 4 | Beam 5 | Beam 6 | Beam 7 | ... |
|--------|--------|--------|--------|--------|--------|--------|--------|-----|
| Beam 1 | —      | X      | R      |        |        |        |        |     |
| Beam 2 | X      | —      | X      | R      |        |        |        |     |
| Beam 3 | R      | X      | —      | X      | R      |        |        |     |
| Beam 4 |        | R      | X      | —      | X      | X      | R      |     |
| Beam 5 |        |        | R      | X      | —      | X      |        |     |
| Beam 6 |        |        |        | X      | X      | —      | X      |     |
| ...    |        |        |        |        |        |        |        |     |

In operation there may be several RSs per beam. It should be appreciated that not all RSs in a particular beam will cause the same inter-beam interference. Therefore, in the preferred embodiment forbidden beam matrix is statistically determined based on the probability of interference considering each RS disposed in the particular antenna beams. However, in an alternative embodiment, forbidden beam matrixes may be developed with respect to individual ones of the RSs, if desired.

It should be appreciated that in a preferred embodiment TDMA system, only one RS is served per BS antenna beam channel at any one time slot. Interference may occur on the downlink when a RS disposed relatively far from the BS in the primary beam requires extra power. This extra energy may cause energy to "spill over" into adjacent BS antenna beams. If the energy is simply in the beam side lobes, it can be easily determined mathematically whether simultaneous usage of the same channel a beam or so away from this primary beam is feasible. However, when the energy from the primary beam is scattered to adjacent beams, such as due to terrain conditions, this situation is preferably measured using a reporting system. For example, the measurement algorithms above may make measurements based on various signal transmission levels to emulate or model disposition of RSs far and/or near. Additionally, or alternatively, measurements may be made during actual communication operations to thereby measure actual use conditions, including the power levels at which particular communications links are operated.

It can readily be appreciated from the table above that, with respect to one particular BS of the exemplary communication network, antenna beams 1, 2, and 3 exclude their nearest neighbors while antenna beam 4 excludes simultaneous use of antenna beams 3, 5, and 6. In this example, resources (i.e., channels and/or antenna beams) would preferably be allocated to avoid simultaneous use of the indicated antenna beams with respect to a same channel so that intolerable co-channel interference does not occur.

It should be appreciated that information in addition to the above shown forbidden simultaneous antenna beam information may be utilized according to the present invention. For example, information may be associated with each antenna beam, either within the above shown forbidden antenna beam table or external thereto, which provides network communication information of interest. Specifically, information regarding particular RSs disposed within particular antenna beams, information regarding position and/or distance of the RSs, information regarding the quality of service and/or capacity needs for the RSs, and the like may be stored and/or utilized according to the present invention. This information may be provided by an operator or other source, such as upon initial deployment or thereafter, determined through system operation, and/or be compiled as historical information.

A preferred embodiment of the present invention provides for the use of a plurality of channels by ones of the RSs. Accordingly, although the use of a particular channel in a particular antenna beam may be prohibited or restricted as discussed above, an RS may change to another channel for communications, if desired. Using information, such as that shown above, for each such channel in each beam communications may be optimized. It should be appreciated that, as sources of interference may be from uncontrollable sources outside the communication system of the present invention, the ability for RSs to change communications channels may provide advantages in quality of communications beyond optimizing communications.

In a preferred embodiment of the present invention allocation of resources is based on per beam traffic needs, such as may be determined through historical information or initial network configuration parameters. Alternatively, allocation of resources is based on first come (first requiring/requesting communication services) first served, causing later to come (later to require/request communication services) to be blocked on particular antenna beams with respect to simultaneous use of a particular channel.

Figure 6:
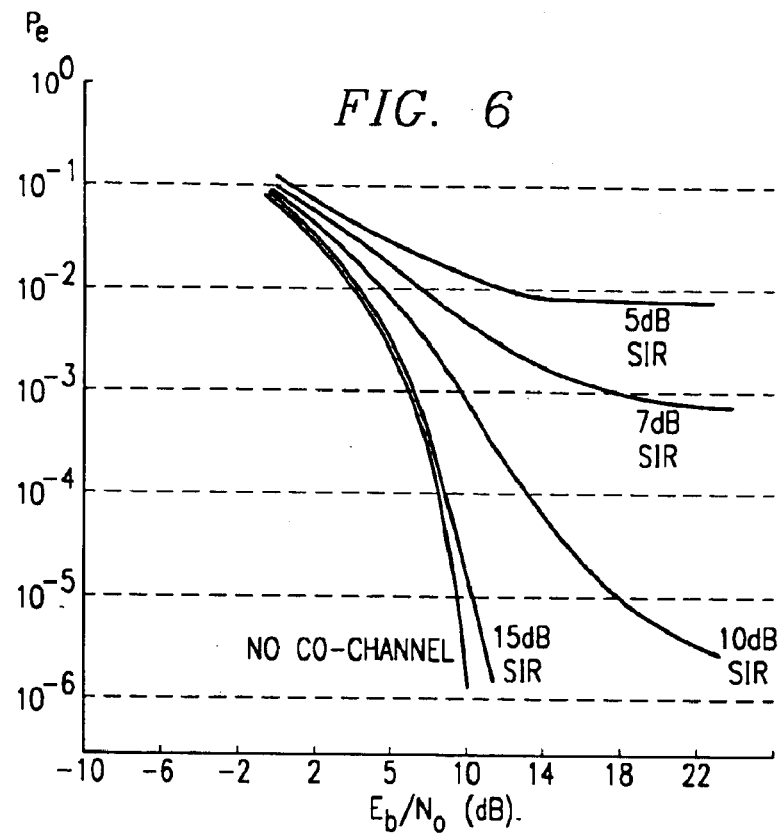
FIG. 6 shows the degradation of a signal with varying amounts of interference.

As described above, that simultaneous use of a channel potentially creates co-channel interference. Depending on factors such as the antenna design and the position of the RS in the antenna beam, the SIR or other signal quality measurement affected by co-channel interference, can vary greatly. In a system using MBA such as in the preferred embodiment of the present invention, beam-to-beam isolation, i.e., the ability of the antenna beams to isolate the signal from other ones of the antenna beams, affects capacity which may be achieved in a cell through the simultaneous use of channels. The graph of FIG. 6 illustrates the degradation of a simple binary signal with varying SIR, as might be experienced in various antenna beams due to simultaneous use of a particular channel at other ones of the antenna beams. The results of such interference are much more amplified for high order modulation, such as high level QAM constellations.

Coding, such as that of spread spectrum CDMA, allows error free transmission at much lower SIR. The penalty in providing such error free transmissions in the presence of higher levels of interference is reduced throughput. However, the use of various rate codes may be utilized to maximize throughput for the particular communication attributes experienced in the link.

Solutions of resource allocation according to the present invention allow simultaneous use of 2 antenna beams, but at a reduced throughput. For example, in a CDMA system RSs disposed relatively close to the BS, i.e., low path loss between BS and RS, do not require highly spread codes to achieve low error rate data. In cellular IS-95 systems, $E_b/N_o$ is essentially constant for every user. However, according to a preferred embodiment of the present invention allowing higher $E_b/N_o$ for RSs requiring little power can be traded for a slight rise in $E_b/N_o$ for other users. Having a higher $E_b/N_o$ allows changing spreading codes to achieve higher throughput.

As indicated in the table above, antenna beams 1 and 3 are not fully mutually exclusive antenna beams, i.e., although co-channel interference is present in sufficient magnitude to cause signal qualities to be less than a desired threshold, simultaneous communications may still be established. The use of a reduced rate code provides communications which are more immune to interference than the higher throughput communications possible with the network equipment. For example, simultaneous rate 2/3 convolution codes could be utilized with each of antenna beams 1 and 3, such as may be determined to be acceptable through reference to the above described information, to provide reduced rate simultaneous communications therewith. Such a use of 2 2/3 rate communication channels provides more capacity than the single full rate code which might otherwise be used with antenna beam 1 to the exclusion of antenna beams 2 and 3.

A similar concept may be applied in TDMA systems. RSs which are disposed relatively close to a BS, or otherwise receive a strong signal, may be operated at a reduced power level and/or operated at a higher data rate. As discussed in more detail below, QAM is an example of modulation where in the same bandwidth, i.e., using a same baud rate, higher levels of modulation may be used to obtain higher data rates.

In the preferred embodiment of the present invention the system operates to automatically optimize simultaneous use of a channel by the affected antenna beams. For example, a database inquiry is performed according to one embodiment of the invention to determine receive energy levels on the primary and interfering antenna beams for both RSs for which simultaneous use of a channel is considered. Thereafter, a determination is made as to whether simultaneous use is desirable, such as through the use of SIR calculations for the user pairs. Such determinations may be carried out for any number of simultaneous uses, such as to three or more RSs simultaneously using a channel by calculating the SIR on each link associated with three RSs.

According to a preferred embodiment of the present invention, the capacity of a cell is optimized by considering the SNR and SIR as well as capacity needs for each RS in the cell. For example, depending upon the SNR available at the RS, the capacity, e.g., the number of bits which may be transmitted to the RS during a defined time slot, may vary greatly. As shown in the table below, an 8 fold capacity increase is obtainable when an extremely high SNR is achievable.

| Capacity Increase | QAM Constellation | $E_b/N_o$ @ $10^{-6}$ | SNR |
| --- | --- | --- | --- |
| 1 | 4 | 10.5 | 13.5 |
| 2 | 16 | 15 | 21.5 |
| 4 | 64 | 18.5 | 27 |
| 8 | 256 | 24 | 33 |

Where a very high SNR or SIR is achievable, a high order modulation technique, such as high order modulation available in QAM, phase shift keying (PSK), or quadrature phase shift keying (QPSK), may be used to provide used to provide increased capacity. For example, where 33 dB SNR is achievable, an 8 fold capacity increase may be realized using 256 QAM to transmit 8 bits per symbol. Where lower SNR is achievable, such as 20 dB, lower order modulation, such as 4 QAM or even possibly 16 QAM, may be utilized. However, it should be appreciated that such lower order modulation techniques may provide no or little capacity increase.

From the above, it should be appreciated that for any given channel condition, there may be determined an optimum bit density, i.e., modulation/coding combination, that maximizes throughput at a particular acceptable communication quality threshold. For example, a particular preselected BER may be maintained during simultaneous use of a communication channel in various antenna beams through altering modulation or coding techniques to adjust throughput. According to the preferred embodiment of the present invention, determinations of the particular antenna beams at a cell simultaneously utilizing a particular channel are made with respect to optimizing throughput achievable with particular antenna beam combinations, particular available bit densities, and/or quality of service considerations with respect to the RSs.

When simultaneous usage of a resource is prohibited, i.e., a particular channel is already utilized in a particular antenna beam thus blocking the use of this channel in that or another antenna beam, a preferred embodiment of the present invention operates to delay communication, such as where data users are present using packet data. For example, the data packet of a particular user desiring use of a resource for which simultaneous usage is prohibited may be delayed one or more time slots for subsequent rechecking of the particular resource. If the resource becomes available, such as may be determined by checking SIR information or the like, the delayed data packet may be communicated using the previously prohibited resource. In a preferred embodiment, class of service, such as data versus voice communication, is used to determine the particular data packet or packets which get delayed or which experience the most delay etcetera.

In addition to determining allowable simultaneous use of channels within antenna beams of a single cell, a preferred embodiment of the present invention makes determinations regarding inter-cell interference, i.e., interference caused to communications associated with RSs outside the coverage area of a particular cell. Preferably, such determinations are based on a number of modeling and/or empirical measurements, such as described above with respect to intra-cell interference. Based upon this modeling and/or measurements, mutually exclusive antenna beam pairs between the "home" BS and the BSs surrounding the home BS are identified. The table below shows an example of mutually exclusive antenna beam pairs as determined for the exemplary communication network of FIG. 8.

| Home BS0 Cell 800 | BS1 Cell 801 | BS2 Cell 802 | BS3 Cell 803 | BS4 Cell 804 | BS5 Cell 805 | BS6 Cell 806 |
|---|---|---|---|---|---|---|
| 800-1 | 801-1 | | | | | |
| | 801-5 | | | | | |
| 800-2 | 801-6 | | | | | |
| | 801-6 | 802-2 | | | | |
| | | 802-3 | | | | |
| | | 802-9 | | | | |
| | | 802-10 | | | | |
| 800-3 | | 802-8 | | | | |
| 800-4 | | | 803-3 | | | |
| | | | 803-4 | | | |
| | | | 803-5 | | | |
| | | | 803-11 | | | |
| . . . | | | | | | |

Figure 8:
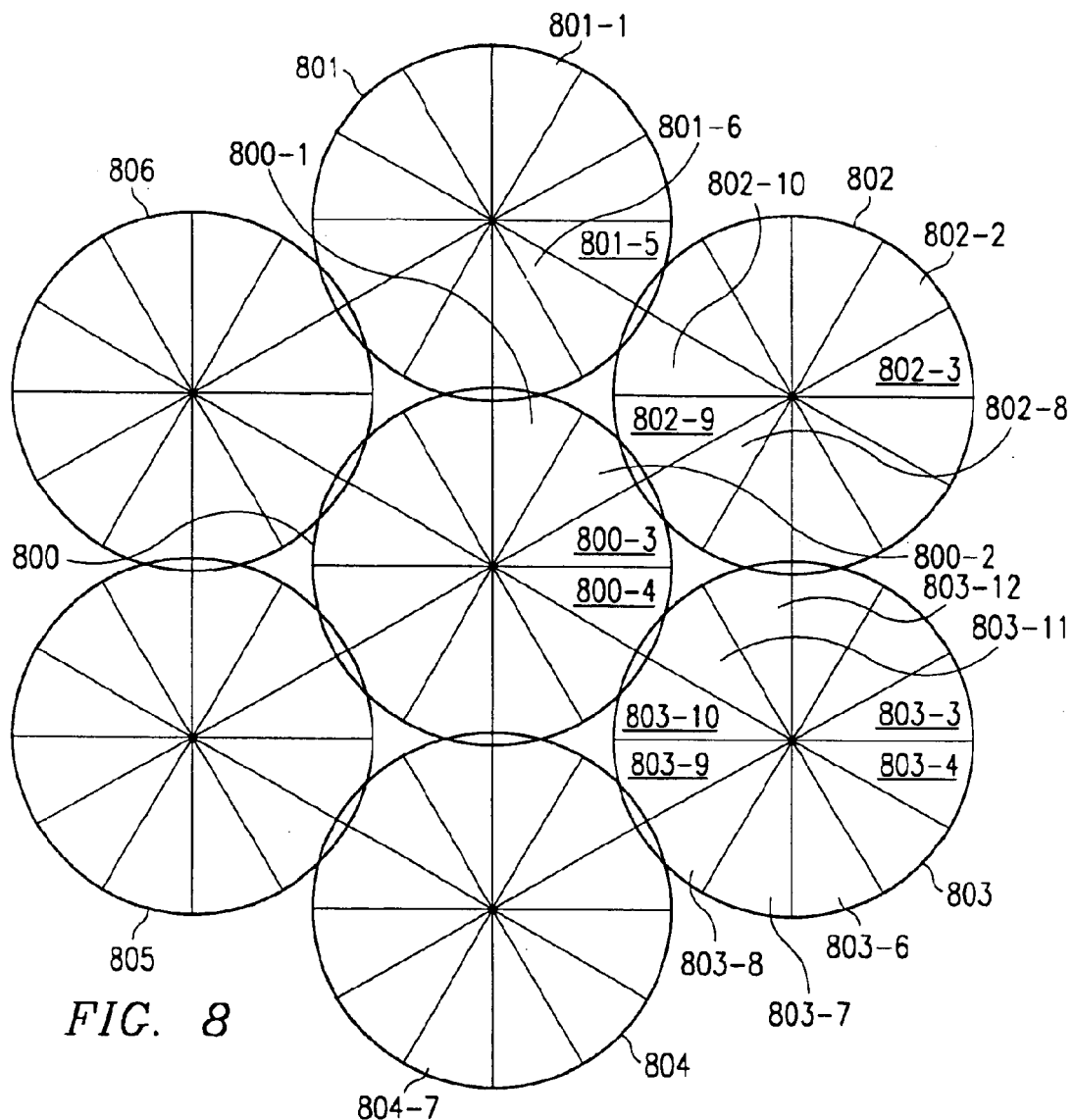
FIG. 8 shows a network of cells according to the present invention.

Shown in FIG. 8 is a communication network including 7 cells, cell 800 surrounded by cells 801–806. Each cell utilizes multiple antenna beams of the preferred embodiment discussed above. For the example described with respect to the table above, cell 800 will be considered as the "home" cell for inter-cell interference determinations. However, it should be appreciated that any cell of the network may be considered as a "home" cell for this purpose. In fact, a preferred embodiment of the present invention makes determinations of mutually exclusive antenna beam pairs for each cell, thereby identifying each cell a "home" cell with respect to its associated inter-cell interference determinations.

As shown in the table above, there are particular combinations of antenna beams that, when one antenna beam of the combination is in use other ones of the combination will experience interference. For example, if antenna beam 800-1 of cell 800 is transmitting, RSs operating in antenna beams 801-1, 801-5 and 801-6 of cell 801 may receive interference too strong to decode their intended transmissions. Accordingly, it may be desired to avoid simultaneous use of such antenna beams, such as with respect to a same channel, to avoid communication errors.

With no communication among BSs of the network, a solution would be to apportion the available resources, i.e., time slots or frequencies, among the cell beam pairs according to their traffic needs. For such time slot operations, the stations would preferably utilize a reference clock such as GPS to ensure synchronization among the BSs of the network. For example, in a single channel system, beam 800-1 of cell 800 may share ½ of its time slots with neighboring antenna beams. With centralized timing, the use of beam 800-1 could easily be prevented or avoided when beams which would cause unacceptable interference, such as antenna beams 801-1, 801-5, and/or 801-6, are in use. Without such a clock, frequency division becomes a preferred alternative.

It should be appreciated that time offsets due to differing propagation paths may affect more than a single coincident time slot at a neighboring BS. Accordingly, a preferred embodiment of the present invention may operate to prohibit the use of multiple time slots at ones of the antenna beams and/or make determinations as to distance etcetera in order to determine particular time slots to identify as prohibited with respect to simultaneous use of antenna beams.

Optimization with communication among BSs is conceptually simpler than that described above. For example, if the BS associated with cell 800 knows or can determine what slots are available with respect to particular antenna beams due to internal and external usage, a next slot assignment may be made on a first come first served basis, sharing the available resources between the cells. In providing a fully optimized solution, a preferred embodiment of the present invention allows buffering of several time slots and optimizing time slot assignments over several slots. Accordingly, the system examines all BS/antenna beam/channel pairs and assigns simultaneous usage to those pairs that just exceed a predetermined threshold, such as a SIR threshold, thereby packing the greatest number of uses of the spectrum into the system operation. It should be appreciated that the use of pairs that just exceed the established threshold is preferred as assigning the least interfering pairs to simultaneous usage may result in low interference, but at a cost in capacity.

In a preferred embodiment employing packet data, a packet optimizer is utilized, such as may be embodied in the circuitry and/or programming of the above described BS controller. The packet optimizer of the most preferred embodiment operates to achieve maximum throughput as is possible subject to communication constraints. Specifically, a preferred embodiment of the present invention optimizes throughput of packets based on considerations regarding allowable delay (such as may be packet or service dependent), allowable SIR (i.e., a low available SIR requires reduced data rate), transmit power level (typically related to the distance from the BS to RS, and ideally known for each packet based on the RS it is associated with, subject to noise and interference), forbidden simultaneous beams (reference to information as described above as to antenna beams which may not be transmitted simultaneously or only at a reduced transmission rate), outside interference levels per antenna beam, the number of transmitters available, and/or the like.

Figure 7A:
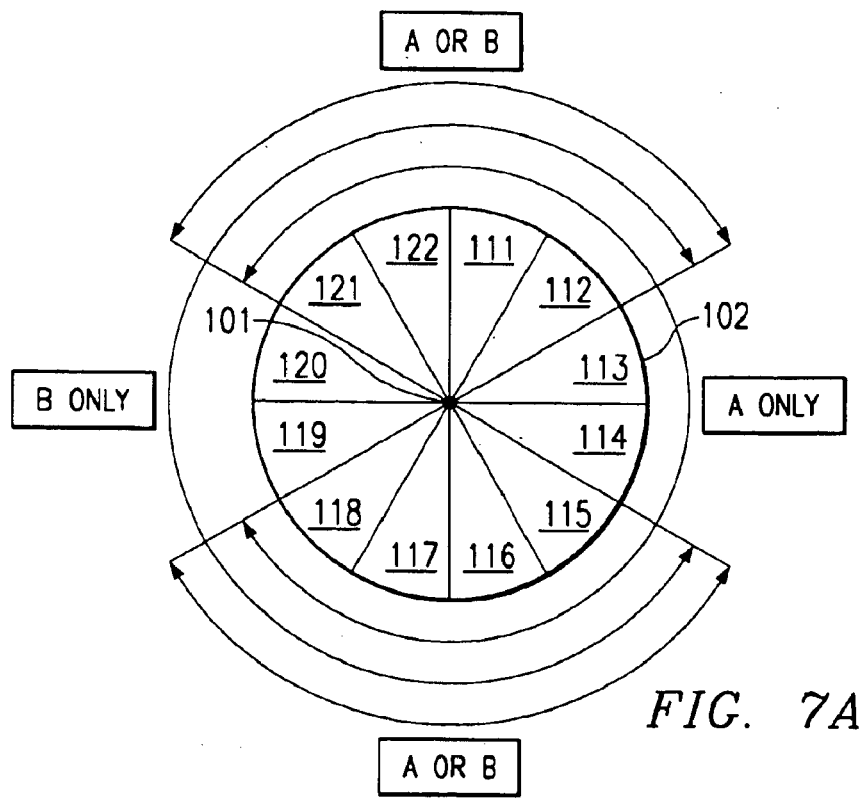
FIG. 7A shows a cell adapted to provide reuse of channels according to the present invention.

Directing attention to FIG. 7A, BS 101 deployed in cell 102 is shown adapted to provide communication of packet types A and B, such as may be associated with a first radio A and a second radio B (intra-cell reuse N=½). It should be appreciated that the configuration of FIG. 7A provides for communication of packet type A throughout antenna beams 111–110 and 121 and 122 and of packet type B throughout antenna beams 111, 112, and 115–122. Accordingly, both packet types A and B may be communicated throughout antenna beams 111, 112, 115–110, 121, and 122. Accordingly, there are three classes of transmission: A and B simultaneously, A and B simultaneously at a reduced throughput, and only A or B. With random arrivals in all beams, there would frequently be a need to transmit 2 packets simultaneously in a same antenna beam or a pair of adjacent antenna beams.

Having the ability to delay packet transmissions according to the preferred embodiment, the system is adapted to pair simultaneous packets better than their random arrivals to improve or optimize throughput. For example, if packets arrive with equal probability for any of the antenna beams, then there is a 50% probability of blockage, i.e., if a same packet type arrives in a same, or possibly nearby, antenna beam blockage results. Specifically, the case of simultaneous arrival of a pair of A packets (AA) or a pair of B packets (BB) represent blockage, whereas the simultaneous arrival of one each of an A packet and a B packet (AB or BA) is acceptable for communications. However, if delays are utilized in the simultaneous arrival of a pair (either AA or BB), 2 acceptable pairings may be made (i.e., 2 AB pairs). For example, if a BB packet paring is delayed until an AA packet paring arrives, one of the B packets may be delayed 3 slots and the other 4 slots, along with one of the A packets being delayed 1 slot to form an AB and BA set of packet parings. With equal probability of arrival for both A and B packets and with infinite time delay, all packets may be communicated with optimum efficiency. However, applying constraints, such as an 8 packet allowable delay, optimization may be reduced and/or communication quality may degrade, i.e., an approximately 1% packet drop may be experienced in packet optimization utilizing the above described assumptions.

Figure 7B:
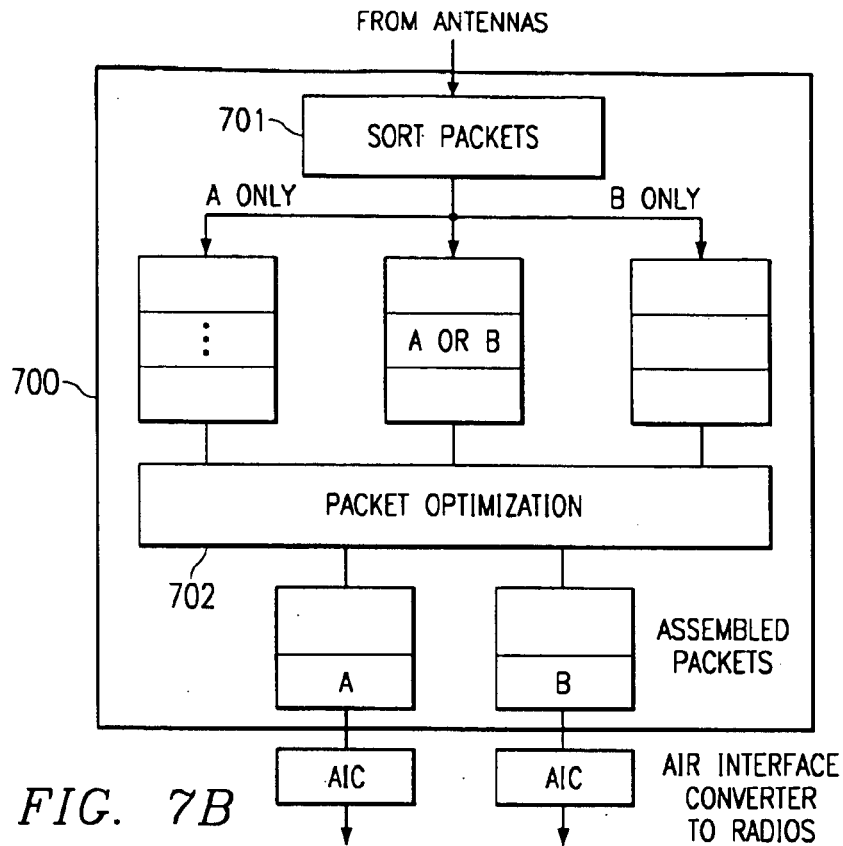
FIG. 7B shows preferred embodiment optimization circuitry for the optimization of data packets for the channel reuse of FIG. 7A.

Directing attention to FIG. 7B, a block diagram of the operation of a preferred embodiment packet optimizer is shown. Packet optimizer 700, such as may be deployed in the BS controller and/or disposed in the signal path between the BS radios and the BS antennas, is shown. Preferably, packet optimizer 700 includes packet sorter 701 into operational categories, i.e., packets of type A only, packets of type B only, and packets which may be utilized as A or B type. Thereafter, packet optimization module 702 provides sequencing of the packets, preferably utilizing the considerations discussed above, to achieve optimization. The optimized pairings and/or sequences of packets are output from packet optimizer 700 for use by other BS equipment, such as may be provided to air interface converters for ultimate provision to BS radios.

Figure 15:
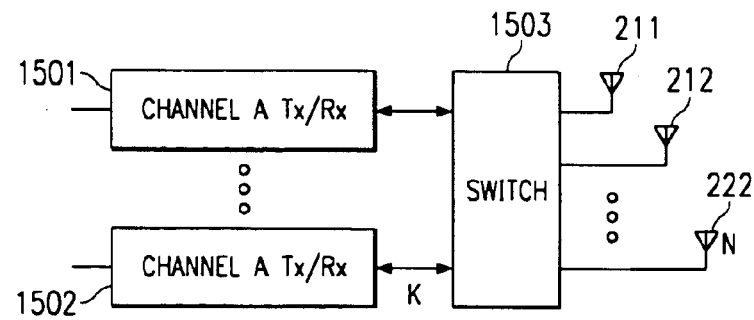
FIG. 15 shows preferred embodiment TDD circuitry of the present invention.

In a preferred embodiment, time division duplexing (TDD) is used with frequency reuse to provide increased communication capacity in the cell. One advantage of TDD systems is that a single switch matrix may be readily utilized in coupling the radios and MBA. Directing attention to FIG. 15, a preferred embodiment of the circuitry of a TDD system providing for multichannel multibeam wireless communications is shown. Specifically multiple (K) BS radios, radios 1501–1502, are selectively coupled to the antenna beams of a multiple beam antenna. Accordingly in the preferred embodiment of FIG. 15 switch 1503 is disposed in the signal paths between radios 1501–1502 and antennas 211–222 and provides selectable communication between any combination thereof.

Figure 16:
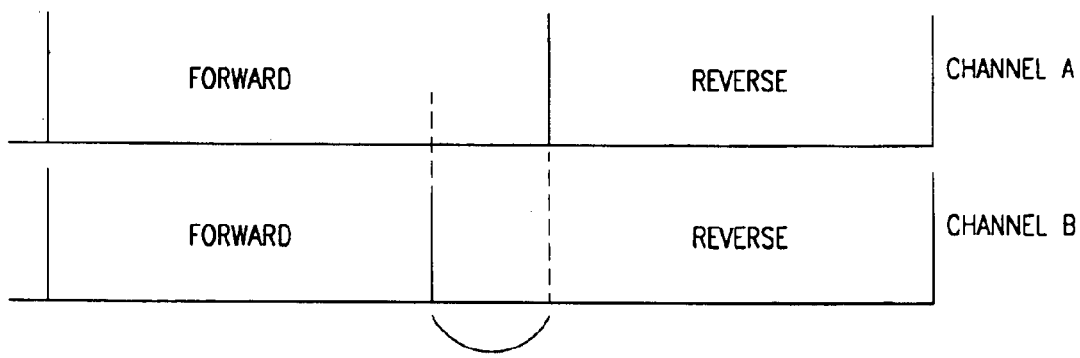
FIG. 16 shows overlap experienced in reuse of TDD channels.

It should be appreciated that, for TDD systems having frequency reuse within a cell, a difficulty occurs when the packet sizes of forward and reverse links are not the same for each antenna beam, i.e., reuse of the channel. This difficulty is caused because the forward link of one channel may overlap with the reverse link of a reuse of that channel. This situation is illustrated in FIG. 16. Shown in FIG. 16 are 2 RF channels A and B (A and B are assumed to be at the same frequency) serving different angular areas (sectors) of a cell. The B channel in this situation is overpowered by leakage from the A channel antenna in the overlap region.

Accordingly, a preferred embodiment of the present invention, wherein TDD is employed, operates to balance the traffic among the antenna beams. For example, where an adjustment of a forward or reverse link frame for one channel is also made for other channels where overlap would be a problem. Such balancing may utilize the above mentioned variable sector boundaries in order to balance the traffic on the channels in order to make it possible to provide the desired communications with the adjusted TDD frames. Additionally or alternatively, the present invention may operate to delay temporarily traffic to eliminate the overlap. Also additionally or alternatively the present invention may employ interference cancellers during he overlap time period to minimize the impact of the overlap.

It should be appreciated that the systems of the present invention may utilize diversity reception and/or transmission at either or both of the BSs and RSs. Such diversity may be provided due to an independent signal path associated with polarization diversity, space diversity, angle diversity, or any combination thereof. The use of such diversity may be relied upon to provide higher signal qualities and, thus, more capacity and/or higher throughput.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A base station system adapted to provide simultaneous reuse of channels at said base station, said system comprising:
   a multiple narrow beam antenna system adapted to provide isolation of signals radiated therein, wherein sectors of said base station are associated with different ones of said antenna beams;
   base station radio circuitry adapted for providing a plurality of discrete simultaneous communications using a first communication channel in different ones of said sectors; and
   circuitry providing controllable coupling of said base station radio circuitry to said multiple narrow beam antenna system, wherein at least a sequence or combination of coupling antenna beams of said multiple narrow beam antenna system to said base station radio equipment by said controllable coupling circuitry is selected to optimize system data throughput.

2. The system of claim 1, wherein a different sector control channel is associated with each sector of said base station.

3. The system of claim 1, wherein a sector control channel is associated with each sector of said base station.

4. The system of claim 3, wherein said sector control channel is a multiple beam antenna access channel adapted for use in identifying a most preferred antenna beam of said multiple narrow beam antenna system for use with each of a plurality of remote stations in communication with said base station.

5. The system of claim 4, wherein said sector control channel includes a forward link data packet comprising synch bits, overhead information, RSSI information, number of antenna beams, current antenna beam, and directed message.

6. The system of claim 4, wherein said sector control channel includes a reverse link data packet comprising a leading and trailing guard time, synch bits, RS identification information, and report message.

7. The system of claim 1, wherein said controllable coupling circuitry is adapted to provide independently controllable coupling of each one of said plurality of discrete simultaneous communications using said first communication channel to ones of said antenna beams.

8. The system of claim 7, wherein said controllable coupling circuitry is adapted to couple each one of said plurality of discrete simultaneous communications using said first communication channel to any one antenna beam of a sector associated with said each one of said plurality of discrete simultaneous communications.

9. The system of claim 1, wherein said controllable coupling circuitry is operable to redefine sectors of said base station by associating different ones of said antenna beams therewith.

10. The system of claim 1, wherein said at least a sequence or combination is determined at least in part in consideration of mutually exclusive antenna beam pairs with respect to simultaneous use of said first communication channel.

11. The system of claim 1, wherein said at least a sequence or combination is determined at least in part in consideration of antenna beam pairs providing reduced signal quality with respect to simultaneous use of said first communication channel.

12. The system of claim 11, wherein said determination is made at least in part through a comparison of a data throughput available using antenna beam pairs providing said reduced signal quality and a data throughput available using an antenna beam of a mutually exclusive antenna beam pair.

13. The system of claim 11, wherein said base station radio circuitry is adapted to communicate different information densities as a function of available signal quality of a wireless communication link.

14. The system of claim 13, wherein said different information densities are provided at least in part using spread spectrum communications with variable spreading factors.

15. The system of claim 13, wherein said different information densities are provided at least in part using QAM with multiple modulation values.

16. The system of claim 1, wherein said first channel is a time division duplex channel including a forward link portion and a reverse link portion, wherein said forward link portion and said reverse link portion are of different durations for a first remote station in communication with said base station and a second remote station in communication with said base station.

17. The system of claim 1, wherein said first channel is a frequency division channel.

18. The system of claim 1, wherein said first channel is a time division channel.

19. The system of claim 1, wherein said first channel is a code division channel.

20. The system of claim 1, wherein said multiple narrow beam antenna system is a fixed multiple beam antenna system.

21. The system of claim 1, wherein said multiple narrow beam antenna system is an adaptive array antenna system.

22. The system of claim 1, wherein said multiple narrow beam antenna system provides a plurality of substantially non-overlapping antenna beams.

23. The system of claim 1, wherein said multiple narrow beam antenna system provides a plurality of substantially overlapping antenna beams.

24. A method for providing simultaneous reuse of channels at a base station of a wireless communication network, said method comprising the steps of:
   coupling multiple narrow antenna beams adapted to provide isolation of signals radiated therein to base station radio circuitry through switchable circuitry;
   determining a resource utilization solution to optimize data throughput in communications between said base station and a plurality of remote stations, wherein said resource utilization solution dynamically determines particular antenna beams and channels for which simultaneous communications may optimally occur; and
   operating said switchable circuitry to achieve said resource utilization solution.

25. The method of claim 24, further comprising the step of:
   defining a plurality of sectors associated with said base station radio circuitry, wherein each sector includes different ones of said antenna beams, wherein said simultaneous use of said channels is use of said channel at one sector of said plurality and reuse of said channel at another sector of said plurality.

26. The method of claim 25, further comprising the step of:
   redefining said plurality of sectors to provide substantially balanced traffic loading among ones of the sectors in response to a change in traffic loading.

27. The method of claim 25, further comprising the step of:
  redefining said plurality of sectors to provide at least a threshold level of a communication attribute selected from the group consisting of:
  an interference level;
  a signal quality; and
  a data throughput.

28. The method of claim 24, wherein said resource utilization solution determining step comprises the step of:
  identifying mutually exclusive antenna beam pairs at said base station.

29. The method of claim 24, wherein said resource utilization solution determining step comprises the step of:
  identifying mutually exclusive antenna beam pairs as between a plurality of base stations.

30. The method of claim 24, wherein said resource utilization solution determining step comprises the step of:
  identifying antenna beam pairs for which reduced communication throughput is possible when utilized simultaneously.

31. A wireless communication system adapted to provide reuse of channels at a base station, said system comprising:
  at least one base station comprising:
    a multiple narrow beam antenna system adapted to provide wireless communications to remote stations to the exclusion of other remote stations, wherein multiple ones of said antenna beams define sectors of said base station and said provision of wireless communications to the exclusion of other remote stations includes exclusion of other remote stations disposed in a same sector; and
    base station radio circuitry adapted for wireless communication with a number of remote stations utilizing a first communication channel simultaneously in different ones of said sectors;
  a plurality of remote stations, wherein said plurality of remote stations include said number of remote stations, ones of said plurality of remote stations comprising:
    remote station radio circuitry adapted for wireless communication utilizing said first communication channel; and
  a controller adapted to optimize system data throughput through a determination with respect to said utilizing said first communication channel simultaneously.

32. The system of claim 31, further comprising:
  circuitry providing controllable coupling of said base station radio circuitry to said multiple narrow beam antenna system.

33. The system of claim 32, wherein said controllable coupling circuitry is adapted to provide independently controllable coupling of multiple discrete signals of said first channel to ones of said antenna beams.

34. The system of claim 33, wherein said controllable coupling circuitry is adapted to couple each one of said multiple discrete signals of said first channel to any antenna beam of a sector associated with said each one of said multiple discrete signals.

35. The system of claim 32, wherein said controllable coupling circuitry is adapted to couple ones of said antenna beams to different portions of said base station radio circuitry to thereby provide adjustable sector boundaries.

36. The system of claim 32, wherein said controllable coupling circuitry includes a switch matrix.

37. The system of claim 31, wherein said determination is made at least in part in consideration of mutually exclusive antenna beam pairs with respect to simultaneous use of said first communication channel.

38. The system of claim 37, wherein said mutually exclusive antenna beam pairs are antenna beam pairs of said base station.

39. The system of claim 37, wherein said mutually exclusive antenna beam pairs are antenna beam pairs of a plurality of base stations of said wireless communication system.

40. The system of claim 37, wherein information regarding said mutually exclusive antenna beam pairs is determined empirically.

41. The system of claim 40, wherein said empirical determination is made during an out of service condition of said wireless communication system.

42. The system of claim 40, wherein said empirical determination is made during an in service condition of said wireless communication system.

43. The system of claim 31, wherein said determination is made at least in part in consideration of antenna beam pairs providing reduced signal quality with respect to simultaneous use of said first communication channel.

44. The system of claim 43, wherein said determination is made at least in part through a comparison of a data throughput available using antenna beam pairs providing said reduced signal quality and a data throughput available using an antenna beam of a mutually exclusive antenna beam pair.

45. The system of claim 43, wherein said base station radio circuitry is adapted to communicate different information densities as a function of available signal quality of a wireless communication link.

46. The system of claim 45, wherein said different information densities are provided by a modulation technique selected from the group consisting of:
  QAM;
  PSK; and
  QPSK.

47. The system of claim 45, wherein said different information densities are provided by the use of variable rate codes.

48. The system of claim 31, wherein said base station radio circuitry is also adapted for wireless communication with a number of remote stations utilizing a second communication channel simultaneously in different ones of said sectors.

49. The system of claim 31, wherein said first channel is a time division duplex channel including a forward link portion and a reverse link portion.

50. The system of claim 49, wherein said forward link portion and said reverse link portion are of different durations for a first remote station of said number of remote stations and a second remote station of said number of remote stations.

51. The system of claim 31, wherein said first channel is a frequency division channel.

52. The system of claim 31, wherein said first channel is a time division channel.

53. The system of claim 31, wherein said first channel is a code division channel.

54. A wireless communication system adapted to provide reuse of channels at a base station, said system comprising:
  at least one base station comprising:
    a multiple narrow beam antenna system adapted to provide wireless communications to remote stations to the exclusion of other remote stations, wherein multiple ones of said antenna beams define sectors of said base station and said provision of wireless communications to the exclusion of other remote stations includes exclusion of other remote stations disposed in a same sector; and base station radio circuitry adapted for wireless communication with a number of remote stations utilizing a first communication channel simultaneously in different ones of said sectors; and a plurality of remote stations, wherein said plurality of remote stations include said number of remote stations, ones of said plurality of remote stations comprising:

remote station radio circuitry adapted for wireless communication utilizing said first communication channel; and a multiple narrow beam antenna system adapted to provide wireless communications to base stations to the exclusion of other base stations.

55. A wireless communication system adapted to provide reuse of channels at a base station, said system comprising:

at least one base station comprising:

a multiple narrow beam antenna system adapted to provide wireless communications to remote stations to the exclusion of other remote stations, wherein multiple ones of said antenna beams define sectors of said base station and said provision of wireless communications to the exclusion of other remote stations includes exclusion of other remote stations disposed in a same sector;

base station radio circuitry adapted for wireless communication with a number of remote stations utilizing a first communication channel simultaneously in different ones of said sectors;

circuitry providing controllable coupling of said base station radio circuitry to said multiple narrow beam antenna system; and a controller coupled to said controllable coupling circuitry adapted to optimize system data throughput through a determination with respect to said utilizing said first communication channel simultaneously;

a plurality of remote stations, wherein said plurality of remote stations include said number of remote stations, ones of said plurality of remote stations comprising:

remote station radio circuitry adapted for wireless communication utilizing said first communication channel.

56. The system of claim 55, wherein said controller controls said controllable coupling circuitry to couple ones of said antenna beams to different portions of said base station radio circuitry to thereby provide adjustable sector boundaries.

57. The system of claim 55, wherein said determination is made at least in part in consideration of mutually exclusive antenna beam pairs with respect to simultaneous use of said first communication channel.

58. The system of claim 57, wherein said mutually exclusive antenna beam pairs are antenna beam pairs of said base station.

59. The system of claim 57, wherein said mutually exclusive antenna beam pairs are antenna beam pairs of a plurality of base stations of said wireless communication system.

60. The system of claim 55, wherein said determination is made at least in part in consideration of antenna beam pairs providing reduced signal quality with respect to simultaneous use of said first communication channel.

61. The system of claim 60, wherein said determination is made at least in part through a comparison of a data throughput available using antenna beam pairs providing said reduced signal quality and a data throughput available using an antenna beam of a mutually exclusive antenna beam pair.

62. The system of claim 60, wherein said base station radio circuitry is adapted to communicate different information densities as a function of available signal quality of a wireless communication link.

* * * * *